US011689081B2

(12) United States Patent
Gallagher et al.

(10) Patent No.: US 11,689,081 B2
(45) Date of Patent: Jun. 27, 2023

(54) GAS ENGINE REPLACEMENT ELECTRONICS MODULARITY FOR FEATURE EXPANSION

(71) Applicant: MILWAUKEE ELECTRIC TOOL CORPORATION, Brookfield, WI (US)

(72) Inventors: Patrick Dennis Gallagher, Oak Creek, WI (US); Timothy James Bartlett, Waukesha, WI (US); Timothy Ryan Obermann, Waukesha, WI (US); Alex Huber, Menomonee Falls, WI (US); William Chapman, III, Delevan, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 298 days.

(21) Appl. No.: 17/126,336

(22) Filed: Dec. 18, 2020

(65) Prior Publication Data

US 2021/0194330 A1 Jun. 24, 2021

Related U.S. Application Data

(60) Provisional application No. 62/951,775, filed on Dec. 20, 2019.

(51) Int. Cl.
*H02K 11/00* (2016.01)
*H01M 10/42* (2006.01)
*H02K 11/33* (2016.01)

(52) U.S. Cl.
CPC ...... *H02K 11/0094* (2013.01); *H01M 10/425* (2013.01); *H02K 11/33* (2016.01); *H01M 2220/20* (2013.01)

(58) Field of Classification Search
CPC . H02K 11/0094; H02K 11/33; H01M 10/425; H01M 2220/20
See application file for complete search history.

(56) References Cited

U.S. PATENT DOCUMENTS 5,149,225 A 9/1992 Artzberger
5,387,052 A 2/1995 Artzberger
(Continued)

FOREIGN PATENT DOCUMENTS

CN 205188931 U 4/2016
EP 3051658 B1 3/2018
JP 2015226099 A 12/2015

OTHER PUBLICATIONS

International Search Report and Written Opinion for Application No. PCT/US2020/065854 dated Apr. 19, 2021 (9 pages).

*Primary Examiner* — Kawing Chan
(74) *Attorney, Agent, or Firm* — Michael Best & Friedrich LLP

(57) ABSTRACT

A method for expanding features of a gas engine replacement device that drives power equipment including controlling, by an electronic processor of the gas engine replacement device, a power switching network to selectively provide power from a battery pack to rotate a motor of the gas engine replacement device. A module interface of the gas engine replacement device receives an external electronics module. A type of the external electronics module received by the module interface is detected by the electronic processor of the gas engine replacement device. The gas engine replacement device is configured by the electronic processor based on the type of the received external electronics module. The electronic processor communicates with the external electronics module via the module interface.

11 Claims, 9 Drawing Sheets

(56) References Cited

U.S. PATENT DOCUMENTS

| | | |
|---|---|---|
| 9,154,009 B2 | 10/2015 | Alemu |
| 2004/0088817 A1* | 5/2004 | Cochran .................. A47L 5/36 |
| | | 15/327.5 |
| 2009/0219118 A1* | 9/2009 | Anderson ............. H01H 27/00 |
| | | 200/43.11 |
| 2010/0216415 A1 | 8/2010 | Arimura et al. |
| 2017/0110946 A1* | 4/2017 | Oktavec ................ B24B 23/028 |
| 2017/0336773 A1 | 11/2017 | Schadow et al. |
| 2018/0138839 A1* | 5/2018 | Puzio .................... H02K 11/28 |
| 2019/0006980 A1 | 1/2019 | Sheeks et al. |
| 2019/0263363 A1 | 8/2019 | McIntyre et al. |
| 2020/0001446 A1 | 1/2020 | Ballard et al. |
| 2020/0076337 A1 | 3/2020 | Abbott et al. |

* cited by examiner

GAS ENGINE REPLACEMENT ELECTRONICS MODULARITY FOR FEATURE EXPANSION

RELATED APPLICATIONS

This application claims the benefit of U.S. Provisional Patent Application No. 62/951,775, filed Dec. 20, 2019, the entire content of which is hereby incorporated by reference.

FIELD

The present application relates to a gas engine replacement device and, more particularly, to input and/or output external electronics modules for adding features to the gas engine replacement device.

BACKGROUND

Outdoor power equipment (e.g., lawn and garden equipment) and construction equipment (e.g., concrete mixers, plate compactors), commonly referred to as power equipment, may include a gas engine to run the equipment. The gas engines may be small, single-cylinder or multi-cylinder gasoline engines.

SUMMARY

Gas engines produce emissions, require refueling, and are not readily configurable for particular applications of various types of equipment or preferences of users. There is a need to drive power equipment with reduced emissions and refueling requirements, and to allow expandable functionality for the sources that drive power equipment.

Embodiments described herein include gas engine replacement devices, also referred to as powerheads, that use, for example, lithium-ion battery packs and electric brushless motors provide several advantages over gas engines including eliminating emissions and a need to refuel with gasoline. Further, embodiments described herein include gas engine replacement devices that allow for expandable functionality.

In one embodiment, a method is provided for expanding features of a gas engine replacement device that drives power equipment. The method includes controlling, by an electronic processor of the gas engine replacement device, a power switching network to selectively provide power from a battery pack to rotate a motor of the gas engine replacement device. A power take-off shaft of the gas engine replacement device protrudes from a side of the housing and receives torque from the motor. The method further includes receiving an external electronics module by a module interface of the gas engine replacement device, and detecting a type of the external electronics module received by the module, configuring the gas engine replacement device based on the type of the external electronics module received by the module interface, and communicating with the external electronics module via the module interface, by an electronic processor of the gas engine replacement device.

In some embodiments, the method includes configuring, by the electronic processor, the gas engine replacement device for a specified method of communication via the module interface of the gas engine replacement device.

In some embodiments, the method includes operating, by the electronic processor, the gas engine replacement device to control the power equipment based on input received from the external electronics module, wherein the external electronics module includes at least one of a sensor, a user interface, or a power equipment interface.

In some embodiments, the method includes transmitting, by the electronic processor, performance information of the power equipment to the external electronics module for indication of the performance information by on a user interface of the external electronics module.

In another embodiment, a gas engine replacement device with feature expansion for driving power equipment is provided. The gas engine replacement device with feature expansion includes a housing, a battery receptacle coupled to the housing. The battery receptacle is configured to removably receive a battery pack. The gas engine replacement device also includes a motor located within the housing, a power take-off shaft that receives torque from the motor and protrudes from a side of the housing, a power switching network that is configured to selectively provide power from the battery pack to the motor, a module interface, and an electronic processor. The electronic processor is coupled to the power switching network, the module interface, and a memory. The memory stores instructions that when executed by the electronic processor configure the electronic processor to selectively provide power from the battery pack to rotate the motor. The electronic processor is also configured to receive an external electronics module by the module interface, detect a type of the external electronics module received by the module interface, configure the gas engine replacement device based on the type of the external electronics module received by the module interface, and communicate with the external electronics module via the module interface.

In some embodiments, the electronic processor is further configured to configure the gas engine replacement device for a specified method of communication via the module interface.

In some embodiments, the electronic processor is further configured to operate the gas engine replacement device to control the power equipment based on input received from the external electronics module, wherein the external electronics module includes at least one of a sensor, a user interface, or a power equipment interface.

In some embodiments, the electronic processor is further configured to transmit performance information of the power equipment to the external electronics module for indication of the performance information by a user interface of the external electronics module.

In another embodiment, a method is provided for expanding features of a gas engine replacement device that drives power equipment with an external electronics module. The method includes receiving, by a gas engine replacement device interface of an external electronics module, an interface of the gas engine replacement device, where the gas engine replacement device includes a motor driven by a battery. The method further includes communicating with the gas engine replacement device via the gas engine replacement device interface by an electronic processor of the external electronics module.

In some embodiments, the method includes receiving, by the electronic processor of the external electronics module, performance information relating to the power equipment driven by the gas engine replacement device, and transmitting a signal to the user interface to indicate the performance information by the user interface.

In some embodiments, the method includes receiving, via a user interface of the electronics module, input relating to the power equipment driven by the gas engine replacement device, and transmitting a signal based on the input received via the user interface via the gas engine replacement device interface to the gas engine replacement device.

In another embodiment, an external electronics module is provided for expanding features of a gas engine replacement device that drives power equipment. The external electronics module includes a gas engine replacement device interface. The gas engine replacement device interface is configured to receive an interface of the gas engine replacement device, where the gas engine replacement device includes a motor driven by a battery. The external electronics module also includes an electronic processor coupled to a memory. The memory stores instructions that when executed by the electronic processor configure the electronic processor to communicate with the gas engine replacement device via the gas engine replacement device interface.

In some embodiments, the external electronics module includes a user interface, where the electronic processor receives performance information relating to the power equipment driven by the gas engine replacement device and transmits a signal to the user interface to indicate the performance information by the user interface.

In some embodiments, the external electronics module includes a user interface, where the electronic processor receives input via the user interface. The input relates to the power equipment driven by the gas engine replacement device. The electronic processor transmits a signal based on the input received via the user interface via the gas engine replacement device interface to the gas engine replacement device for control of a motor of the gas engine replacement device.

In some embodiments, the external electronics module includes an input user interface, and an output user interface. The electronic processor receives input via the input user interface where the input relates to the power equipment driven by the gas engine replacement device. The electronic processor transmits a signal based on the input received via the input user interface to the output user interface for actuating an indication device.

In some embodiments, the external electronics module includes a sensor and the electronic processor receives output from the sensor and transmits a signal based on the output from the sensor to the gas engine replacement device via the gas engine replacement device interface for control of a motor of the gas engine replacement device.

In some embodiments, the external electronics module includes a motor and an accessory interface where the electronic processor receives output from the sensor and transmits a signal based on the output from the sensor to the motor to drive an accessory device.

In some embodiments, the external electronics module includes a user interface. The user interface includes at least one of an indicator, a switch, a display, a motor speed control selector; a speaker, a relay switch, a motor forward or reverse selector, an on-off switch, or a mode switch.

In some embodiments, the external electronics module includes a sensor. The sensor includes at least one of a float, a position sensor, an accelerometer, a gyroscope, a pressure sensor, or an air quality sensor.

In some embodiments, the external electronics module includes a gas engine replacement device interface, where the external electronics module receives power from a battery pack coupled to the gas engine replacement device via the gas engine replacement device interface.

In some embodiments, the gas engine replacement device interface includes a mechanical key for preventing unauthorized devices from attaching to the gas engine replacement device interface.

In some embodiments, the a gas engine replacement device interface includes a wireless transceiver for wirelessly communicating with the gas engine replacement device.

In some embodiments, the external electronics module includes a forward/reverse switch configured for selecting between forward and reverse rotation of the motor of the gas engine replacement device.

Before any embodiments are explained in detail, it is to be understood that the embodiments are not limited in its application to the details of construction and the arrangement of components set forth in the following description or illustrated in the following drawings. Embodiments described herein are capable of being practiced in or of being carried out in various ways. Also, it is to be understood that the phraseology and terminology used herein is for the purpose of description and should not be regarded as limited. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect. Additionally, as used herein with a list of items, "and/or" means that the items may be taken all together, in sub-sets, or as alternatives (for example, "A, B, and/or C" means A; B; C; A and B; B and C; A and C; or A, B, and C).

It should be noted that a plurality of hardware and software based devices, as well as a plurality of different structural components may be utilized to implement embodiments described herein. Furthermore, and as described in subsequent paragraphs, the specific configurations illustrated in the drawings are intended as example embodiments and other alternative configurations are possible. The terms "processor" "central processing unit" and "CPU" are interchangeable unless otherwise stated. Where the terms "processor" or "central processing unit" or "CPU" are used as identifying a unit performing specific functions, it should be understood that, unless otherwise stated, those functions can be carried out by a single processor, or multiple processors arranged in any form, including parallel processors, serial processors, tandem processors or cloud processing/cloud computing configurations.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components, may be utilized to implement the embodiments.

Other features and aspects will become apparent by consideration of the following detailed description and accompanying drawings.

DETAILED DESCRIPTION

Figure 1:
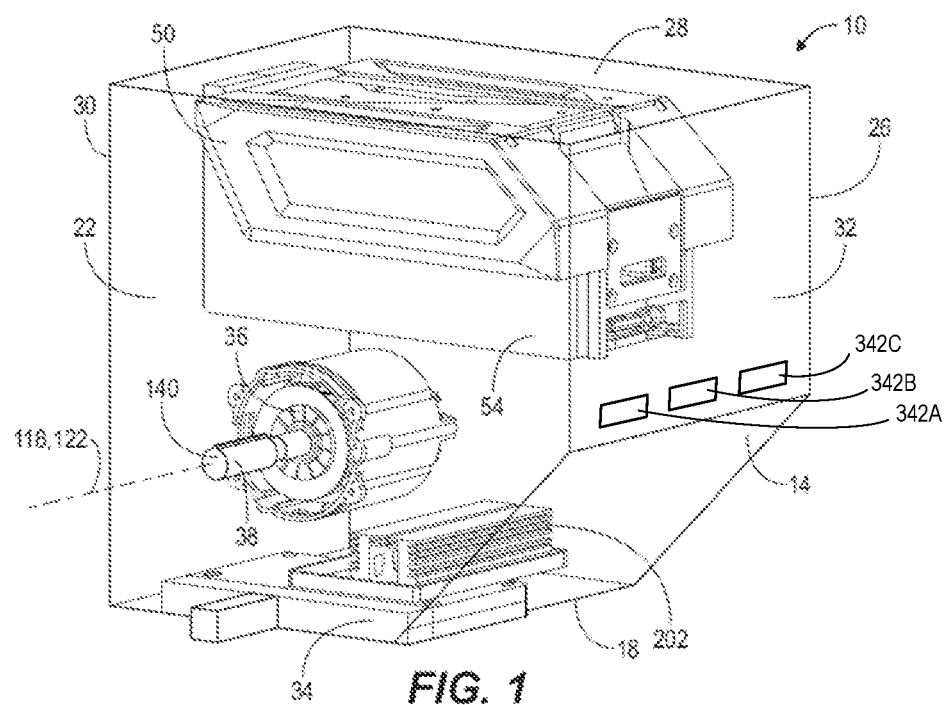
FIG. 1 is a perspective view of a gas engine replacement device including interfaces for connecting electronics of an external electronics module, according to some embodiments.
Figure 2:
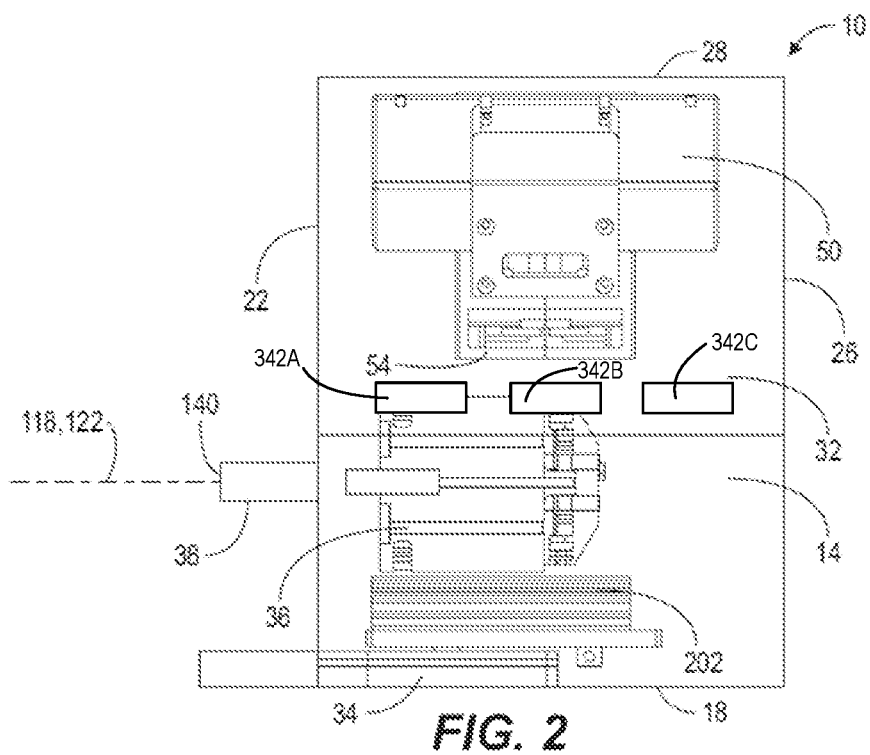
FIG. 2 is a plan view of the gas engine replacement device of FIG. 1 including interfaces for connecting electronics of an external electronics module, according to some embodiments.
Figure 3:
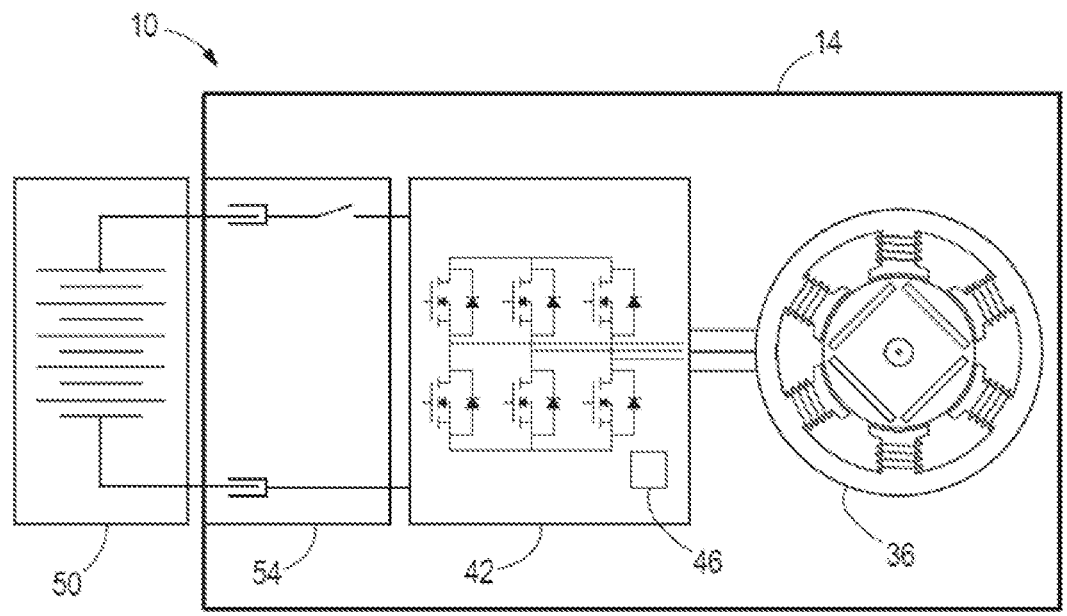
FIG. 3 is a schematic view of the gas engine replacement device of FIG. 1, according to some embodiments.

As shown in FIGS. 1 and 2, a gas engine replacement device 10 for use with a piece of power equipment includes a housing 14 with a first side 18, a second side 22 adjacent the first side 18, a third side 26 opposite the second side 22, a fourth side 28 opposite the first side 18, a fifth side 30 extending between the second and third sides 22, 26, and a sixth side 32 opposite the fifth side 30. The gas engine replacement device 10 also includes a flange 34 coupled to the housing 14 on the first side 18, an electric motor 36 located within the housing 14, and a power take-off shaft 38 that protrudes from the second side 22 and receives torque from the motor 36. As explained in further detail below, in some embodiments, the power take-off shaft 38 protrudes from the first side 18 and from the flange 34. As shown in FIG. 3, the gas engine replacement device 10 also includes control electronics 42 positioned within the housing 14 and including wiring and a controller 46 that is electrically connected to the motor 36. A similar gas engine replacement device 10 is described and illustrated in U.S. patent application Ser. No. 16/551,197, filed Aug. 26, 2019, the entire content of which is incorporated herein by reference. The gas engine replacement device 10 also includes one or more module interfaces 342a, 342b, 342c in the housing 14 for receiving external electronics modules 344 (e.g., external electronics modules).

Figure 4:
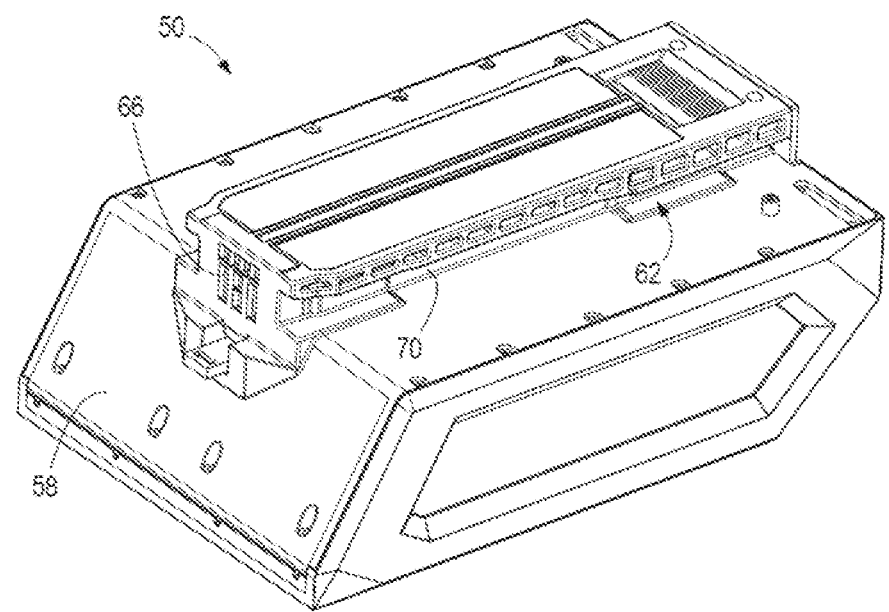
FIG. 4 is a perspective view of a battery pack of the gas engine replacement device of FIG. 1, according to some embodiments.
Figure 5:
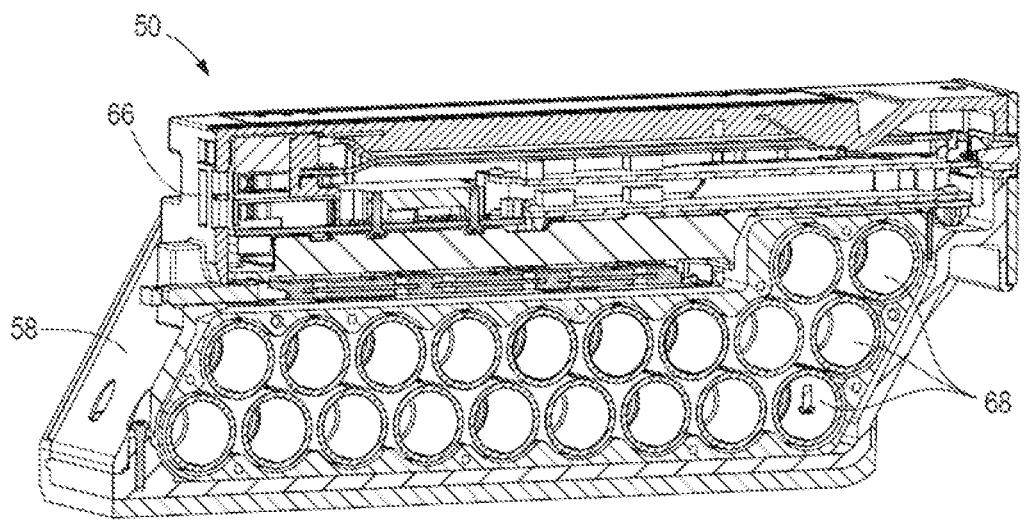
FIG. 5 is a cross-sectional view of the battery pack of FIG. 4, according to some embodiments.
Figure 6:
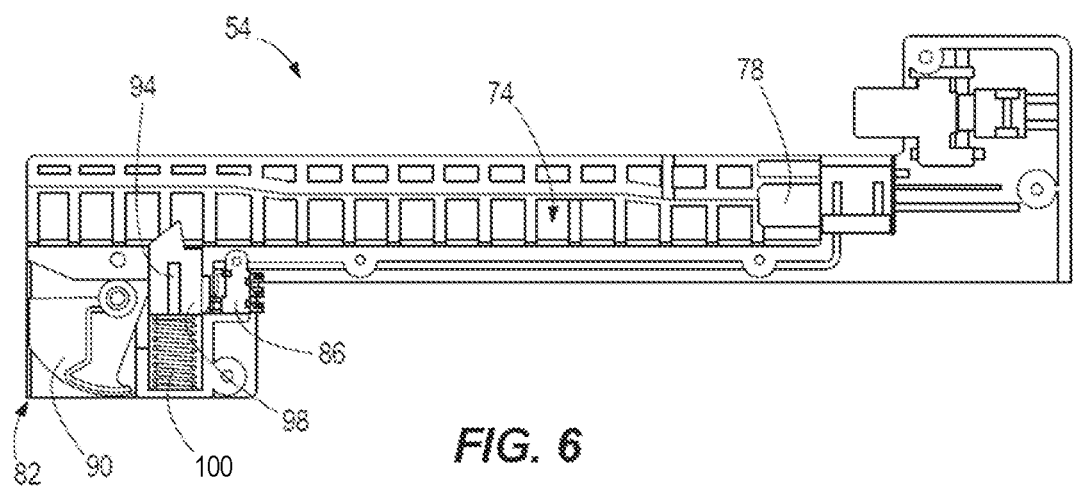
FIG. 6 is a cross-sectional view of a battery receptacle of the gas engine replacement device of FIG. 1, according to some embodiments.

As shown in FIGS. 1-6, the gas engine replacement device 10 also includes a battery pack 50 that is removably received in a battery receptacle 54 in the housing 14 to transfer current from the battery pack 50 to the motor 36 via the control electronics 42. With reference to FIGS. 4-6, the battery pack 50 includes a battery pack housing 58 with a support portion 62 and a first terminal 66 that is electrically connected to a plurality of battery cells 68 supported by the battery pack housing 58. The support portion 62 provides a slide-on arrangement with a projection/recess portion 70 cooperating with a complementary projection/recess portion 74 (shown in FIG. 6) of the battery receptacle 54. In the embodiment illustrated in FIGS. 4-6, the projection/recess portion 70 of the battery pack 50 is a guide rail and the projection/recess portion 74 of the battery receptacle 54 is a guide recess. A similar battery pack is described and illustrated in U.S. Patent Publication No. 2019/0006980 filed Jul. 2, 2018, the entire content of which is incorporated herein by reference. In some embodiments, the battery cells 68 have a nominal voltage of up to about 80 V. In some embodiments, the battery cells 68 have a nominal voltage of up to about 120 V. In some embodiments, the battery pack 50 has a weight of up to about 6 lb. In some embodiments, each of the battery cells 68 has a diameter of up to 21 mm and a length of up to about 71 mm. In some embodiments, the battery pack 50 includes up to twenty battery cells 68. In some embodiments, the battery cells 68 are connected in series. In some embodiments, the battery cells 68 are operable to output a sustained operating discharge current of between about 40 A and about 60 A. In some embodiments, each of the battery cells 68 has a capacity of between about 3.0 Ah and about 5.0 Ah.

FIG. 6 illustrates the battery receptacle 54 of the gas engine replacement device 10 in accordance with some embodiments. The battery receptacle 54 includes the projection/recess portion 74, a second terminal 78, a latching mechanism 82, and a power disconnect switch 86. The projection/recess portion 74 cooperates with the projection/recess portion 70 of the battery pack 50 to attach the battery pack 50 to the battery receptacle 54 of the gas engine replacement device 10. When the battery pack 50 is attached to the gas engine replacement device 10, the second terminal 78 and the first terminal 66 are electrically connected to each other. The latching mechanism 82 protrudes from a surface of the battery receptacle 54 and is configured to engage the battery pack 50 to maintain engagement between the battery pack 50 and the battery receptacle 54. Thus, the battery pack 50 is connectable to and supportable by the battery receptacle 54 such that the battery pack 50 is supportable by the housing 14 of the gas engine replacement device 10. In some embodiments, the battery receptacle 54 is arranged on the housing 14 in a position to create a maximum possible distance of separation between the motor 36 and the battery pack 50, in order to inhibit vibration transferred from the motor 36 to the battery pack 50. In some embodiments, elastomeric members are positioned on the battery receptacle 54 in order to inhibit vibration transferred from the motor 36, via the housing 14, to the battery pack 50.

In other embodiments (not shown), the latching mechanism 82 may be disposed at various locations (e.g., on a sidewall, an end wall, an upper end wall etc., of the battery receptacle 54) such that the latching mechanism 82 engages corresponding structure on the battery pack 50 to maintain engagement between the battery pack 50 and the battery receptacle 54. The latching mechanism 82 includes a pivotable actuator or handle 90 operatively engaging a latch member 94. The latch member 94 is slidably disposed in a bore 98 of the battery receptacle 54 and is biased toward a latching position by a biasing member 100 (e.g., a spring) to protrude through a surface of the battery receptacle 54 and into a cavity in the battery pack 50.

The latching mechanism also 82 includes the power disconnect switch 86 (e.g., a micro-switch) facilitating electrical connecting/disconnecting the battery pack 50 from the battery receptacle 54 during actuation of the handle 90 to withdraw the latch member 94 from the battery pack 50. The power disconnect switch 86 may act to electrically disconnect the battery pack 50 from the gas engine replacement device 10 prior to removal of the battery pack 50 from the battery receptacle 54. The power disconnect switch 86 is actuated when the latch member 94 is moved from the latched position (i.e., when the latch member 94 is completely within the cavity of the battery pack 50) to an intermediate position. The power disconnect switch 86 is electrically connected to the controller 46 and may generate an interrupt to indicate that the battery pack 50 is being disconnected from the gas engine replacement device 10. When the controller 46 receives the interrupt, the controller 46 begins a power down operation to safely power down the control electronics 42 of the gas engine replacement device 10. A similar latching mechanism and disconnect switch is described and illustrated in U.S. Patent Publication No. 2019/0006980, which has been incorporated herein by reference.

Figure 7:
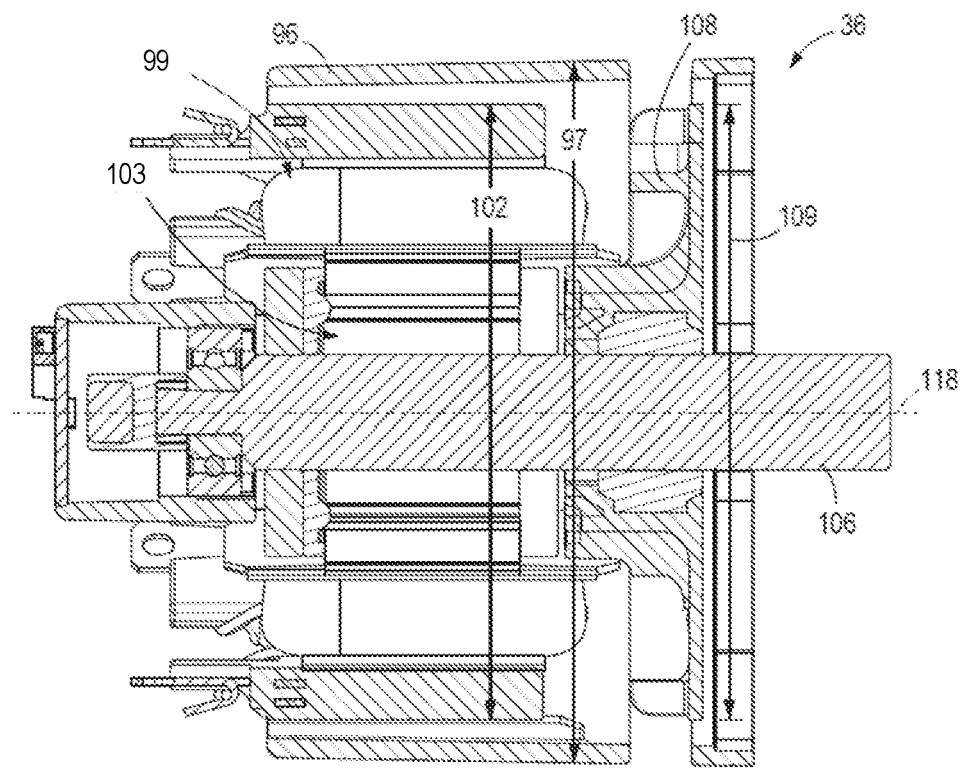
FIG. 7 is a cross-sectional view of a motor of the gas engine replacement device of FIG. 1, according to some embodiments.

As shown in FIG. 7, the motor 36 includes a motor housing 96 having an outer diameter 97, a stator 99 having a nominal outer diameter 102 of up to about 80 mm, a rotor 103 having an output shaft 106 and supported for rotation within the stator 99, and a fan 108. A similar motor is described and illustrated in U.S. Patent Publication No. 2019/0006980, which has been incorporated herein by reference. In some embodiments, the motor 36 is a brushless direct current motor. In some embodiments, the motor 36 has a power output of at least about 2760 W. In some embodiments, the power output of the motor 36 may drop below 2760 W during operation. In some embodiments, the fan 108 has a diameter 109 that is larger diameter 97 of the motor housing 96. In some embodiments, the motor 36 can be stopped with an electronic clutch (not shown) for quick overload control. In some embodiments, the motor 36 has a volume of up to about 443,619 mm$^3$. In some embodiments, the motor has a weight of up to about 4.6 lb. The housing 14 includes an inlet vent and an outlet vent, such that the motor fan 108 pulls air through the inlet vent and along the control electronics 42 to cool the control electronics 42, before the air is exhausted through the outlet vent. In the embodiment illustrated in FIG. 7, the motor 36 is an internal rotor motor, but in other embodiments, the motor 36 can be an outer rotor motor with a nominal outer diameter (i.e. the nominal outer diameter of the rotor) of up to about 80 mm.

Figure 8:
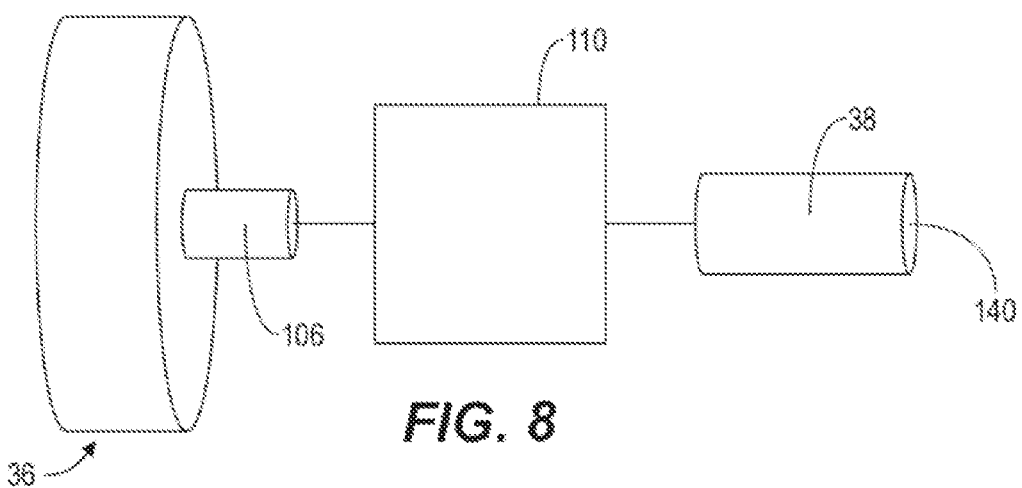
FIG. 8 is a schematic view of a motor, a gear train, and a power take-off shaft of the gas engine replacement device of FIG. 1, according to some embodiments.

With reference to FIG. 8, the motor 36 can transfer torque to the power take-off shaft 38 in a variety of configurations. In some embodiments, the output shaft 106 is also the power take-off shaft 38, such that the motor 36 directly drives the power take-off shaft 38 without any intermediate gear train. For example, the motor 36 may be a direct drive high pole count motor. As shown in FIG. 8, in other embodiments, the gas engine replacement device 10 includes a gear train 110 that transfers torque from the motor 36 to the power take-off shaft 38. In some embodiments, the gear train 110 can include a mechanical clutch (not shown) to discontinue the transfer of torque from the motor 36 to the power take-off shaft 38. In some embodiments, the gear train 110 may include a planetary transmission that transfers torque from the output shaft 106 to the power take-off shaft 38, and a rotational axis of the output shaft 106 is coaxial with a rotational axis of the power take-off shaft 38. In some embodiments, the gear train 110 includes a spur gear engaged with the output shaft 106 of the rotor, such that the rotational axis of the output shaft 106 is offset from and parallel to the rotational axis of the power take-off shaft 38. In some embodiments, the gear train 110 includes a bevel gear, such that the rotational axis of the output shaft 106 is perpendicular to the rotational axis of the power take-off shaft 38. In other embodiments utilizing a bevel gear, the rotational axis of the output shaft 106 is not perpendicular, parallel, or coaxial to the rotational axis of the power take-off shaft 38, and the power take-off shaft 38 protrudes from the flange 34.

In some embodiments, the gas engine replacement device 10 includes ON/OFF indicators (not shown). In some embodiments, the gas engine replacement device 10 includes a filter (not shown) to keep airborne debris out of the motor 36 and control electronics 42. In some embodiments, the filter includes a dirty filter sensor (not shown) and a self-cleaning mechanism (not shown). In some embodiments, the motor 36 will mimic a gas engine response when encountering resistance, such as slowing down or bogging. In some embodiments, the gas engine replacement device 10 includes a heat sink 202 in the housing 14 for air-cooling the control electronics 42 (FIGS. 1 and 2). In some embodiments, the gas engine replacement device 10 is liquid cooled.

In some embodiments, the output shaft 106 of the rotor 103 has both forward and reverse capability as further described below. In some embodiments, the forward and reverse capability is controllable without shifting gears of the gear train 110, in comparison to gas engines, which cannot achieve forward/reverse capability without extra gearing and time delay. Thus, the gas engine replacement device 10 provides increased speed, lower weight, and lower cost. Because the gas engine replacement device 10 has fewer moving parts and no combustion system, as compared with a gas engine, it also provides additional speed, weight, and cost advantages.

The gas engine replacement device 10 is able to operate in any orientation (vertical, horizontal, upside down) with respect to a ground surface for a prolonged period of time, giving it an advantage over four-cycle gas engines, which can only be operated in one orientation and at slight inclines for a shorter period of time. Because the gas engine replacement device 10 does not require gas, oil, or other fluids, it can run, be transported, and be stored upside down or on any given side without leaking or flooding In operation, the gas engine replacement device 10 can be used to replace a gas engine system. Specifically, the gas engine replacement device 10 can be mounted to the piece of power equipment having a second bolt pattern by aligning a first bolt pattern defined by the plurality of apertures in the flange 34 with the second bolt pattern. In some embodiments, the flange 34 may include one or more intermediate mounting members or adapters arranged between the flange 34 itself and the flange of the piece of power equipment having the second bolt pattern, such that the adapter(s) couple the flange 34 to the piece of power equipment. In these embodiments, the adapter includes both the second bolt pattern and the first bolt pattern, such that the first bolt pattern of the flange 34 aligns with the first bolt pattern of the adapter and the second bolt pattern of the adapter aligns with the second bolt pattern defined in the piece of power equipment, thereby allowing the flange 34 of the gas engine replacement device 10 to be coupled to the piece of power equipment.

Alternatively, the gas engine replacement device 10 can be connected to a piece of power equipment using a belt system by providing a belt that operatively connects the power take-off shaft and an equipment bit. Thus, the power take-off shaft 38 of the gas engine replacement device 10 can be used to drive the equipment.

During operation, the housing 14 of the gas engine replacement device 10 is comparably much cooler than the housing of an internal combustion unit because there is no combustion in the gas engine replacement device 10. Specifically, when a gas engine unit runs, the housing of the gas engine unit is 220 degrees Celsius or higher. In contrast, when the gas engine replacement device 10 runs, all of the exterior surfaces of the housing 14 are less than 95 degrees Celsius. Tables 1 and 2 below list with further specificity the temperature limits of different components on the housing 14 of the gas engine replacement device 10.

Table 1 below lists the Underwriter's Laboratories (UL) temperature limits of different components typically used in power tools, with respect to whether those components are formed of metal, plastic, rubber, wood, porcelain, or vitreous. For example, at least in some embodiments, the plastic rated temperatures are never exceeded by the gas engine replacement device 10.

TABLE 1

|  | Metal | Plastic/Rubber/ Wood | Porcelain/ Vitreous |
| --- | --- | --- | --- |
| Casual Contact | 85° C. | 85° C. | 85° C. |
| Handles and knobs that are continuously held | 55° C. | 75° C. | 65° C. |
| Handles and knobs that are only briefly held (i.e. switches) | 60° C. | 80° C. | 70° C. |

Table 2 below lists the UL temperature limits of different components of the battery pack housing 58 of the battery pack 50, with respect to whether those components are formed of metal, plastic or rubber. For example, at least in some embodiments, the plastic rated temperatures are never exceeded by the gas engine replacement device 10.

TABLE 2

|  | Metal | Plastic/Rubber |
| --- | --- | --- |
| Casual Contact | 70° C. | 95° C. |
| Handles and knobs that are continuously held | 55° C. | 75° C. |
| Handles and knobs that are only briefly held (i.e. switches) | 60° C. | 85° C. |

Figure 9:
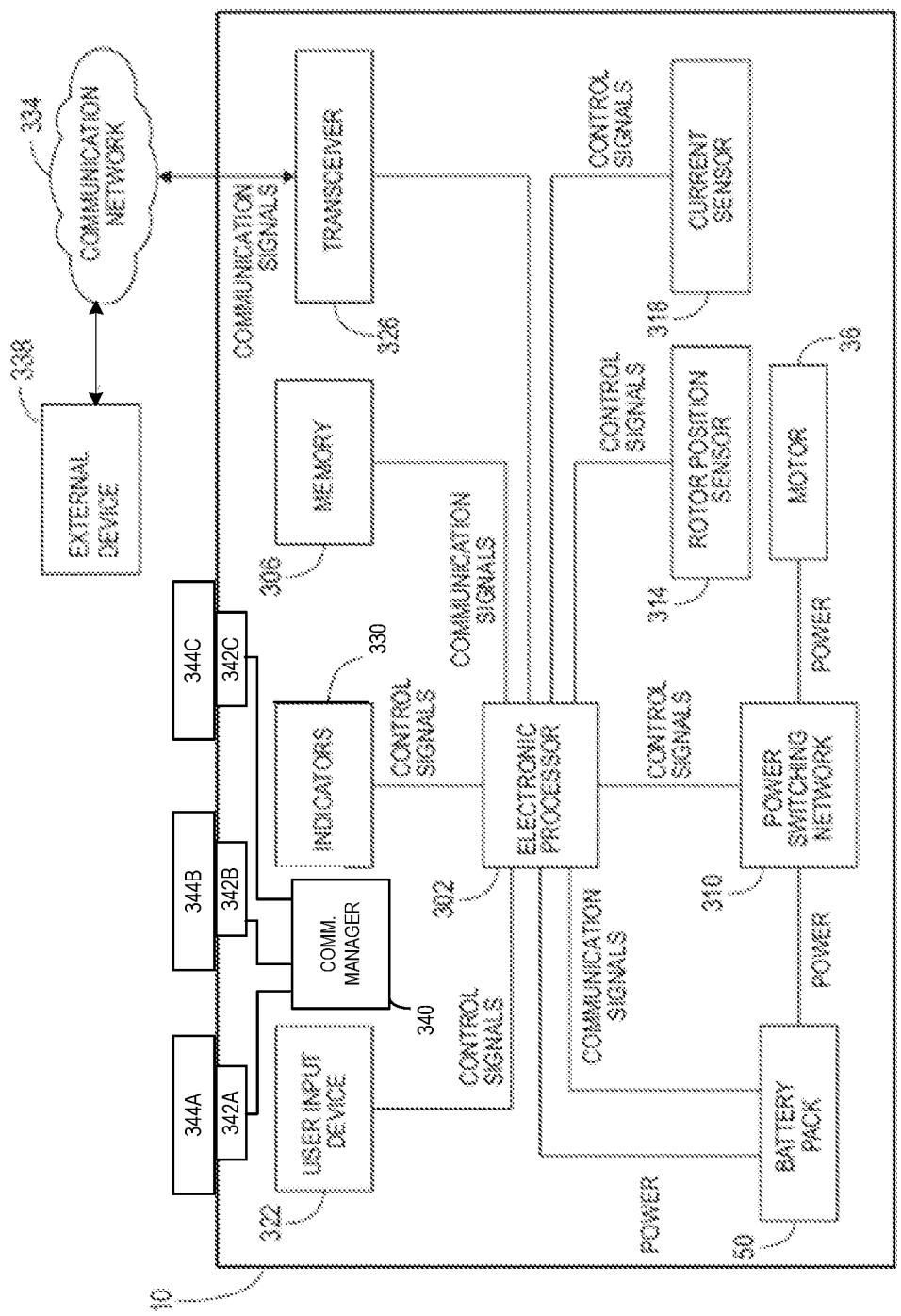
FIG. 9 is a schematic view of the gas engine replacement device of FIG. 1 including interfaces for connecting electronics of an external electronics module, according to some embodiments.

FIG. 9 illustrates a simplified block diagram of the gas engine replacement device 10 according to one example embodiment. As shown in FIG. 9, the gas engine replacement device 10 includes an electronic processor 302, a memory 306, the battery pack 50, a power switching network 310, the motor 36, a rotor position sensor 314, a current sensor 318, a user input device 322 (e.g., a trigger or power button), a transceiver 326, indicators 330 (e.g., light-emitting diodes), a communications manager 340, and one or more module interfaces 342a, 342b, 342c. Also shown in FIG. 9 are one or more external electronics modules 344A, 344B, 344C. In some embodiments, the gas engine replacement device 10 includes fewer or additional components than those shown in FIG. 9. For example, the gas engine replacement device 10 may include a battery pack fuel gauge, work lights, additional sensors, kill switch, the power disconnect switch 86, etc. In some embodiments, elements of the gas engine replacement device 10 illustrated in FIG. 9 including one or more of the electronic processor 302, memory 306, power switching network 310, rotor position sensor 314, current sensor 318, user input device 322 (e.g., a trigger or power button), transceiver 326, and indicators 330 (e.g., light-emitting diodes) form at least part of the control electronics 42 shown in FIG. 3, with the electronic processor 302 and the memory 306 forming at least part of the controller 46 shown in FIG. 3.

The memory 306 includes read only memory (ROM), random access memory (RAM), other non-transitory computer-readable media, or a combination thereof. The electronic processor 302 is configured to communicate with the memory 306 to store data and retrieve stored data. The electronic processor 302 is configured to receive instructions and data from the memory 306 and execute, among other things, the instructions. In particular, the electronic processor 302 executes instructions stored in the memory 306 to perform the methods described herein.

As described above, in some embodiments, the battery pack 50 is removably attached to the housing of the gas engine replacement device 10 such that a different battery pack 50 may be attached and removed to the gas engine replacement device 10 to provide different amount of power to the gas engine replacement device 10. Further description of the battery pack 50 (e.g., nominal voltage, sustained operating discharge current, size, number of cells, operation, and the like), as well as the motor 36 (e.g., power output, size, operation, and the like), is provided above with respect to FIGS. 1-8.

The power switching network 310 enables the electronic processor 302 to control the operation of the motor 36. Generally, when the user input device 322 is depressed (or otherwise actuated), electrical current is supplied from the battery pack 50 to the motor 36, via the power switching network 310. When the user input device 322 is not depressed (or otherwise actuated), electrical current is not supplied from the battery pack 50 to the motor 36. In some embodiments, the amount in which the user input device 322 is depressed is related to or corresponds to a desired speed of rotation of the motor 36. In other embodiments, the amount in which the user input device 322 is depressed is related to or corresponds to a desired torque. In other embodiments, a separate input device (e.g., slider, dial, or the like) is included on the gas engine replacement device 10 in communication with the electronic processor 302 to provide a desired speed of rotation or torque for the motor 36.

In some embodiments, the user input device 322 may be a forward/reverse switch actuated by a user or a mode selection switch that allows the user to select a mode of operation. The user input device 322 provides a control signal to the electronic processor 302 to switch the direction of rotation of the motor 36 based on the actuation of the user input device 322. In some embodiments, the input may be received from one or more sensors of the gas engine replacement device 10 or a power equipment coupled to the gas engine replacement device 10. In some embodiments, the input may be received from, for example, a smart phone through the communication network 334.

In response to the electronic processor 302 receiving a drive request signal from the user input device 322, the electronic processor 302 activates the power switching network 310 to provide power to the motor 36. Through the power switching network 310, the electronic processor 302 controls the amount of current available to the motor 36 and thereby controls the speed and torque output of the motor 36. The power switching network 310 may include numerous field-effect transistors (FETs), bipolar transistors, or other types of electrical switches. For instance, the power switching network 310 may include a six-FET bridge (see FIG. 10) that receives pulse-width modulated (PWM) signals from the electronic processor 302 to drive the motor 36. In some embodiments, the electronic processor 302 receives the drive request signal from an external electronics module 344 and the electronic processor 302 activates the power switching network 310 to provide power to the motor 36.

The rotor position sensor 314 and the current sensor 318 are coupled to the electronic processor 302 and communicate to the electronic processor 302 various control signals indicative of different parameters of the gas engine replacement device 10 or the motor 36. In some embodiments, the rotor position sensor 314 includes a Hall sensor or a plurality of Hall sensors. In other embodiments, the rotor position sensor 314 includes a quadrature encoder attached to the motor 36. The rotor position sensor 314 outputs motor feedback information to the electronic processor 302, such as an indication (e.g., a pulse) when a magnet of a rotor of the motor 36 rotates across the face of a Hall sensor. In yet other embodiments, the rotor position sensor 314 includes, for example, a voltage or a current sensor that provides an indication of a back electro-motive force (back emf) generated in the motor coils. The electronic processor 302 may determine the rotor position, the rotor speed, and the rotor acceleration based on the back emf signals received from the rotor position sensor 314, that is, the voltage or the current sensor. The rotor position sensor 314 can be combined with the current sensor 318 to form a combined current and rotor position sensor. In this example, the combined sensor provides a current flowing to the active phase coil(s) of the motor 36 and also provides a current in one or more of the inactive phase coil(s) of the motor 36. The electronic processor 302 measures the current flowing to the motor based on the current flowing to the active phase coils and measures the motor speed based on the current in the inactive phase coils.

Based on the motor feedback information from the rotor position sensor 314, the electronic processor 302 can determine the position, velocity, and acceleration of the rotor. In response to the motor feedback information and the signals from the user input device 322, the electronic processor 302 transmits control signals to control the power switching network 310 to drive the motor 36. For instance, by selectively enabling and disabling the FETs of the power switching network 310, power received from the battery pack 50 is selectively applied to stator windings of the motor 36 in a cyclic manner to cause rotation of the rotor of the motor 36. The motor feedback information is used by the electronic processor 302 to ensure proper timing of control signals to the power switching network 310 and, in some instances, to provide closed-loop feedback to control the speed of the motor 36 to be at a desired level. For example, to drive the motor 36, using the motor positioning information from the rotor position sensor 314, the electronic processor 302 determines where the rotor magnets are in relation to the stator windings and (a) energizes a next stator winding pair (or pairs) in the predetermined pattern to provide magnetic force to the rotor magnets in a direction of desired rotation, and (b) de-energizes the previously energized stator winding pair (or pairs) to prevent application of magnetic forces on the rotor magnets that are opposite the direction of rotation of the rotor.

The current sensor 318 monitors or detects a current level of the motor 36 during operation of the gas engine replacement device 10 and provides control signals to the electronic processor 302 that are indicative of the detected current level. The electronic processor 302 may use the detected current level to control the power switching network 310 as explained in greater detail below.

The transceiver 326 allows for communication between the electronic processor 302 and an external device 338 (e.g., a smart phone, tablet, or laptop computer) over a wired or wireless communication network 334. In some embodiments, the transceiver 326 may comprise separate transmitting and receiving components. In some embodiments, the transceiver 326 may comprise a wireless adapter attached to the gas engine replacement device 10. In some embodiments, the transceiver 326 is a wireless transceiver that encodes information received from the electronic processor 302 into a carrier wireless signal and transmits the encoded wireless signal to the external device 338 over the communication network 334. The transceiver 326 also decodes information from a wireless signal received from the external device 338 over the communication network 334 and provides the decoded information to the electronic processor 302.

The communication network 334 provides a wired or wireless connection between the gas engine replacement device 10 and the external device 338. The communication network 334 may comprise a short-range network, for example, a BLUETOOTH network, a Wi-Fi network or the like, or a long range network, for example, the Internet, a cellular network, or the like.

As shown in FIG. 9, the indicators 330 are also coupled to the electronic processor 302 and receive control signals from the electronic processor 302 to turn on and off or otherwise convey information based on different states of the gas engine replacement device 10. The indicators 330 include, for example, one or more light-emitting diodes ("LEDs"), or a display screen. The indicators 330 can be configured to display conditions of, or information associated with, the gas engine replacement device 10. For example, the indicators 330 are configured to indicate measured electrical characteristics of the gas engine replacement device 10, the status of the gas engine replacement device 10, the mode of the gas engine replacement device 10, etc. The indicators 330 may also include elements to convey information to a user through audible or tactile outputs. In some embodiments, the indicators 330 include an eco-indicator that indicates an amount of power being used by the load during operation.

The connections shown between components of the gas engine replacement device 10 are simplified in FIG. 9. In practice, the wiring of the gas engine replacement device 10 is more complex, as the components of a gas engine replacement device are interconnected by several wires for power and control signals. For instance, each FET of the power switching network 310 is separately connected to the electronic processor 302 by a control line; each FET of the power switching network 310 is connected to a terminal of the motor 36; the power line from the battery pack 50 to the power switching network 310 includes a positive wire and a negative/ground wire; etc. Additionally, the power wires can have a large gauge/diameter to handle increased current. Further, although not shown, additional control signal and power lines are used to interconnect additional components of the gas engine replacement device 10.

With reference to FIGS. 1, 2, 9 and 10, the housing 14 includes one or more module interfaces 342a, 342b, 342c that are configured to removably receive and support interchangeable modular electronic devices such as the external electronics module(s) 344. In the illustrated embodiment, the housing 14 has three module interfaces 342a, 342b, 342c disposed on one side of the gas engine replacement device 10. However, this configuration is merely exemplary, as the housing 14 may include more or less than three module interfaces 342a, 342b, 342c, and each side of the housing 14 may include more or less that three module interfaces 342a, 342b, 342c.

With continued reference to FIGS. 1, 2, 9 and 10, each module interface 342a, 342b, 342c includes a communication interface and a coupling interface. The communication interface includes an electrical connector that may be disposed within a recess of the housing 14. The electrical connector is configured to facilitate electrical communication and/or data communication between the external electronics module 344 and the gas engine replacement device 10. The electrical connector may be any suitable type of input and/or output port. Additionally, in some embodiments the electrical connector may define separate power connectors and data connectors, which may similarly be any suitable type of power connectors and data connectors. In some embodiments, power from the battery pack 50 is supplied to an external electronics module 344 and is transmitted via a module interface 342a, 342b, 342c via an electrical connector. For example, to power the external electronics module 344, a cable of 3 to 6 wires may be utilized in order to provide the communication lines and the voltage input with a ground for return.

The gas engine replacement device 10 may be configured to receive a variety of different external electronics modules 344 with the interface(s) 342a, 342b, 342c. In some embodiments, an external electronics module 344 may include a component that is designed for a particular piece of power equipment that is attached to and driven by the gas engine replacement device 10. The specified external electronics module 344 may be received by the gas engine replacement device 10 via a module interface 342a, 342b, 342c or a set of interfaces configured to receive that particular external electronics module 344. These external electronics modules 344 and module interfaces 342a, 342b, 342c allow users to add features to their gas engine replacement device 10 and/or to the power equipment driven by the gas engine replacement device 10 after they purchase their equipment. For example, when a concrete saw, pump, or compactor is attached to and/or driven by the gas engine replacement device 10, an external electronics module 344 may include one or more performance indicators specified for the attached power equipment (see below for more details).

Alternatively, or in addition, various external electronics modules 344 may include one or more generic hardware component(s) (e.g., switches, relays, floats, position sensors, accelerometers, gyroscopes, pressure sensors, air quality sensors, displays, etc.) that can be interchangeably received by generic module interface(s) 342a, 342b, 342c. The generic external electronics modules 344 may be received by generic module interfaces 342a, 342b, 342c and signals may be routed to the electronic processor 302 and/or output to other external electronics module(s) 344 via other module interfaces 342a, 342b, 342c. For example, the output signals may be transmitted to external electronics modules 344 (e.g., to control displays, lights, LEDs, warnings, audible alerts, relays, or other feedback user interfaces). Generic external electronics modules 344 may be used by the OEM or end user and provide a more efficient and effective use of the gas engine replacement device 10 and attached power equipment since they may receive input and provide feedback tailored to a specific situation and usage.

The gas engine replacement device 10 includes a communications manager 340 that may be included in the electronic processor 302 or may be a separate processor component. The electronic processor 302 may receive signals from and/or transmit signals to the one or more external electronics modules 344 utilizing the communications manager 340. In some embodiments, the electronic processor 302 receives a signal from a first external electronics module 344 and generates a signal for transmission based on the received signal. For example, the signal may be transmitted to the power switching network 310 to drive the motor 36 and/or control how the motor is driven based on input received from an external electronics module 344. Alternatively, or in addition, the electronic processor 302 may transmit the output signal to a second external electronics module 344 based on the signal received from a first external electronics module 344. In some embodiments, the communications manager 340 may translate received signals for communication with the electronic processor 302 or another external electronics module 344. For example, a signal received from a first external electronics module 344 via a first module interface 342A may be adapted for communication to a second external electronics module 344 via a second module interface 342B and/or to a third external electronics module 344 via a third module interface 342C.

The electronic processor 302 may be configured for receiving a particular type of external electronics module 344. Moreover, the type of communication connections supported between the electronic processor 302 and an external electronics module 344 via a module interface 342a, 342b, 342c may be fixed, pre-defined (e.g., by an OEM), or may be user configurable. For example, a user may configure the electronic processor 302, using an application on the external device 338, for receiving a particular type of external electronics module 344 and/or for a communicating via one or more module interfaces 342a, 342b, 342c based on a specified communication method. The application on the external device 383 communicates configuration parameters to the electronic processor 302 via the transceiver 326 based on user input. The user may configure the gas engine replacement device 10 to receive an input from an external electronics module 344 in a specific way, such as with a specified type of data communications, a voltage level detected using an analog to digital converter of the electronic processor 302, a resistance level, a standard digital I/O, etc. Output from the electronic processor 302 may be configured to be a PWM modification to the power switching network 310 to control the motor 36, a signal to the module interface 342a, 342b, 342c including a general-purpose input/output (GPIO) state change, or another form of communication via the module interface 342a, 342b, 342c. Furthermore, various combinations of communication ports may be configured for the module interface(s) 342a, 342b, 342c and more than one output event may be generated.

In some embodiments, signals of various communication circuits, interfaces, or communications protocols (e.g., RS485, Universal Asynchronous Receiver/Transmitter (UART), Serial Peripheral Interface (SPI), Control Area Network (CAN bus), or Universal Serial Bus (USB) etc.) or voltage values that are detected by the electronic processor 302 via a module interface 342a, 342b, 342c from an external electronics module 344, can be used by the electronic processor 302 to identify a particular external electronics module 344. For example, when voltage levels are received from an external electronics module 344, an analog to digital converter (ADC) of the electronic processor 302 may be used to determine which external electronics module 344 sent the voltage signal based on the voltage level being provided. The electronic processor 320 may identify the source of the signal using a signifier in a look-up table. Alternatively, or in addition, when a communication protocol is used, the electronic processor 302 may load-in operational information via the module interface 342a, 342b, 342c and configure the gas engine replacement device 10 with specified communication functions to be enabled and store information on how to load and/or save data from an external electronics module 344.

Communication with the gas engine replacement device 10 by an external electronics module 344 may include connecting, based on the configured communication method, to either an internal or external communication buffer on the gas engine replacement device 10. When exchanging information with the electronic processor 302, the external electronics module 344 may provide a device ID so that the electronic processor 302 can configure a definition for the external electronics module 344 and unlock appropriate features to be accessed by or for the external electronics module 344. Subsequent communications from the same external electronics module 344 may utilize the same device ID as packet identification such that the communications manager 340 can direct data received from the external electronics module 344 into an appropriate section of firmware.

Figure 10:
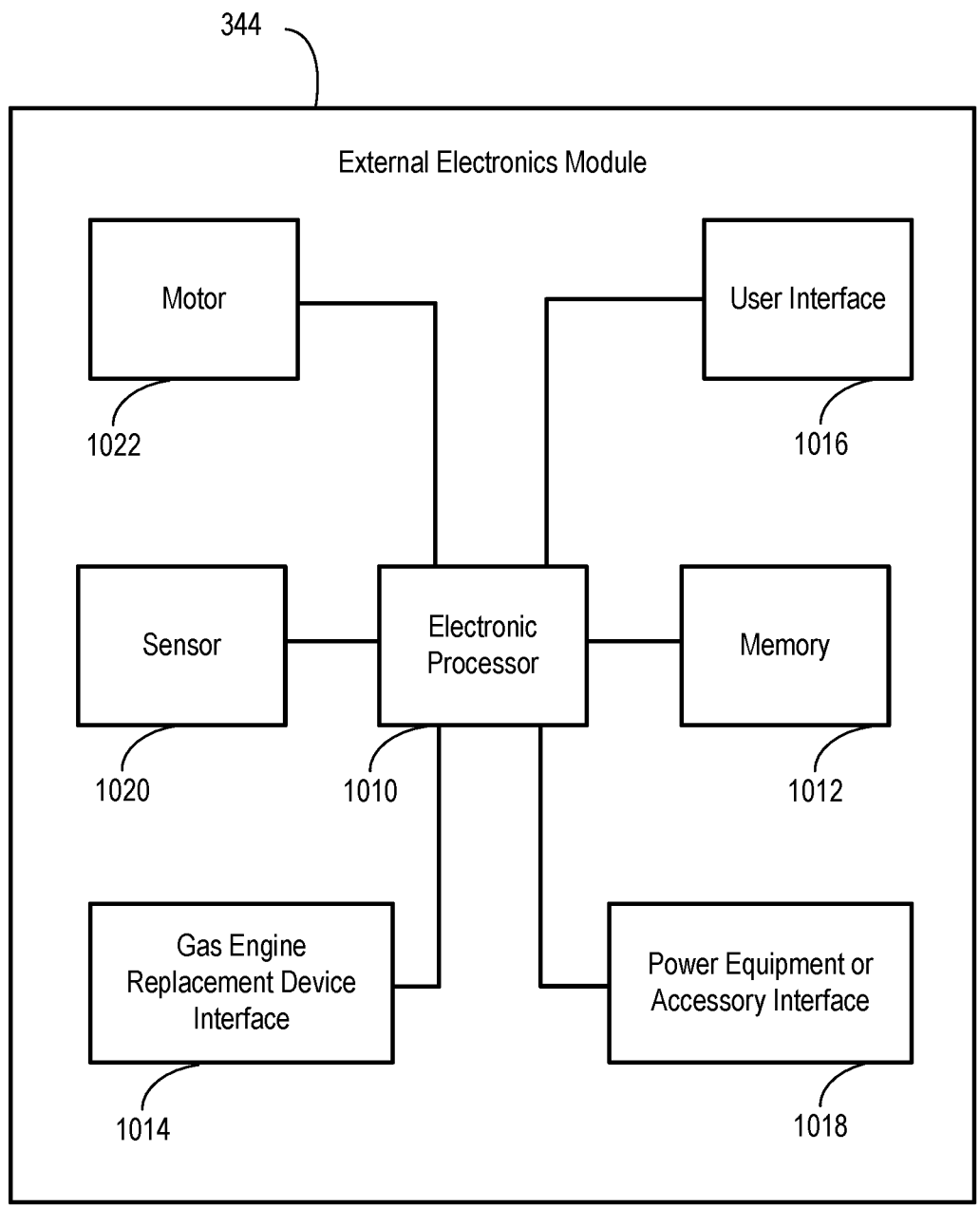
FIG. 10 is a schematic view of an external electronics module for attaching electronics to the gas engine replacement device of FIG. 1, according to some embodiments.

FIG. 10 is a schematic view of an example of an external electronics modules 344 (e.g., one of the external electronics modules 344a, 344b, 344c) configured to attach to the gas engine replacement device 10. The external electronics module 344 may include an electronic processor 1010, a memory 1012, a gas engine replacement device interface 1014 (or GER device interface 1014), a user interface 1016, a power equipment/accessory interface 1018, a sensor 1020, and a motor 1022. In the illustrated embodiment of FIG. 10, the external electronics module 344 includes elements 1010, 1012, 1014, 1016, 1018, 1020, and 1022. However, in some embodiments, the external electronics module 344 includes fewer or additional components than those shown in FIG. 10. For example, in some embodiments, the motor 1022 is not included, and in some embodiments, the sensor 1020 is not included. Further, in some embodiments, a load other than the motor 1022 is provided (e.g., one or more solenoid actuators that control power provided to yet another load).

The memory 1012 includes read only memory (ROM), random access memory (RAM), other non-transitory computer-readable media, or a combination thereof. The electronic processor 1010 is configured to communicate with the memory 1012 to store data and retrieve stored data. The electronic processor 1010 is configured to receive instructions and data from the memory 1012 and execute, among other things, the instructions. In particular, the electronic processor 1010 executes instructions stored in the memory 1012 to perform the methods described herein. In some embodiments, the external electronics module 344 may not include the electronic processor 1010 and/or the memory 1012 and may function based on hardware elements or circuitry of the external electronics module 344. For example, input from one or more of the sensor(s) 1020, the user interface 1016, the GER device interface 1014, and the power equipment/accessory interface 1018, may be routed to one or more of the electronic processor 302 via the GER device interface 1014, the user interface 1016, or the power equipment/accessory interface 1018.

The GER device interface 1014 may be disposed on a housing (e.g., the housing 1110 of FIG. 11) of the external electronics module 344. The GER device interface 1014 includes one or more interfaces that are configured to removably receive and support the module interface(s) 342a, 342b, 342c of the gas engine replacement device 10, either directly or via a connector and cable to the module interface(s) 342a, 342b, 342c (e.g., the external electronics module 344 or a portion of the module may be handheld). In some embodiments, the module interface(s) 342a, 342b, 342c and/or the GER device interface(s) 1014 includes a mechanical key for guiding connection of the interfaces and preventing unauthorized or incompatible devices from attaching thereto. In some embodiments the module interface(s) 342a, 342b, 342c and/or the GER device interface(s) 1014 are configured with, for example, mechanical casings and/or electrical enclosures to protect the device or module electronics against intrusion, dust, accidental contact, and water damage, and may be ingress rated. Alternatively, or in addition, the GER device interface 1014 may include a wireless transceiver such that the electronic processor 1010 may communicate with the electronic processor 302 via the transceiver 326.

The GER device interface 1014 may be coupled to the electronic processor 1010 of the external electronics module 344 such that the electronic processor 1010 of the external electronics module 344 is communicatively coupled to the electronic processor 302 of the gas engine replacement device 10 via the GER device interface 1014 of the external electronics module 344 and the module interface 342a, 342b, 342c of the gas engine replacement device 10.

With continued reference to FIGS. 1, 2, 9 and 10, the GER device interface 1014 includes a communication interface and a coupling interface. The communication interface includes an electrical connector that corresponds to the module interface 342a, 342b, 342c. The electrical connector is configured to facilitate electrical communication and/or data communication between the external electronics module 344 and the gas engine replacement device 10. The electrical connector may be any suitable type of input and/or output connector. Additionally, in some embodiments the electrical connector may define separate power connectors and data connectors, which may similarly be any suitable type of power connectors and data connectors. In some embodiments, power from the battery pack 50 is supplied to the external electronics module 344 and is transmitted via a module interface 342a, 342b, 342c and the electrical connector. For example, to power the external electronics module 344, a cable of 3 to 6 wires may be utilized in order to provide the communication lines and the voltage input with a ground for return.

The user interface 1016 may be disposed on a housing (e.g., the housing the user interface 1016 of FIG. 11) of the external electronics module 344 or may be separate from the housing and coupled by a cable or wirelessly (e.g. the interface may be hand held). The user interface 1016 is coupled to the electronic processor 1010. The user interface 1016 may have input and/or output features to receive user input and/or provide feedback to users about the gas engine replacement device 10, the external electronics module 344, and/or the power equipment attached to the gas engine replacement device 10. In some embodiments, the user interface 1016 may be similar to the user input device 322 and/or the indicators 330 of the gas engine replacement device 10, or the user interface 1016 may be operated in place of the user input device 322 and/or the indicators 330. For example, the user interface 1016 may include a trigger or power button such that when the user interface 1016 is depressed (or otherwise actuated), a signal is transmitted by the electronic processor 1010 to the electronic processor 302 and electrical current is supplied from the battery pack 50 to the motor 36 via the power switching network 310. The user interface 1016 may be utilized to control a desired speed of rotation or applied torque of the motor 36 of the gas engine replacement device 10. In some embodiments, the user interface 1016 may include a trigger pull, a slider, a dial, a display device (e.g., an interactive display), or the like. In some embodiments, the user interface 1016 includes a forward/reverse switch actuated by a user or a mode selection switch that allows the user to select a mode of operation of the gas engine replacement device 10.

In some embodiments, the user interface 1016 includes an indicator and the electronic processor 1010 provides control signals to the user interface 1016 to turn on, turn off, or otherwise convey information based on different states of the gas engine replacement device 10 that may be received by the electronic processor 1010 from the electronic processor 302 of the gas engine replacement device 10. The user interface 1016 may include, for example, one or more light-emitting diodes ("LEDs") or a display screen. The user interface 1016 can be configured to display conditions of, or information associated with, the gas engine replacement device 10, the external electronics module 344, or the power equipment attached to the gas engine replacement device 10. For example, the user interface 1016 may be configured to indicate measured electrical characteristics of the gas engine replacement device 10, the status of the gas engine replacement device 10, the mode of the gas engine replacement device 10, etc. The user interface 1016 may also include elements to convey information to a user such as through displays, lights, LEDs, warnings, audible alerts, or other feedback user interfaces. In some embodiments, the user interface 1016 includes an eco-indicator that indicates an amount of power being drawn from the battery pack 50 and used by the load during operation.

In some embodiments, the external electronics module 344 may include a power equipment/accessory interface 1018 to connect to the power equipment (e.g., the pump system 1220 of FIG. 12) or to an accessory (e.g., light, fan, vacuum, sprayer, speaker, etc.). The power equipment/accessory interface 1018 may connect directly, via a cable, or wirelessly (e.g., the power equipment/accessory interface 1018 may include a wireless transceiver) to the power equipment or the accessory. In some embodiments, the electronic processor 1010 of the external electronics module 344 may receive operational or performance data from the power equipment or accessory that may be utilized to provide feedback to a user via the user interface 1016, for example.

In some embodiments, the external electronics module 344 includes one or more sensors 1020 (e.g., a level sensor, floats, position sensors, a temperature sensor, accelerometers, gyroscopes, pressure sensors, air quality sensors, a motor speed sensor, etc.). The sensor(s) 1020 may be configured to detect a condition or state of the external electronics module 344, the gas engine replacement device 10, and/or the surrounding environment. In some embodiments, the electronic processor 1010 receives an analog or digital signal from the sensor(s) 1020 and determines a responsive action. In some embodiments, the electronic processor 1010 is be configured to receive output from the sensor(s) 1020 and/or user input from the user interface 1016 and determine a responsive action using a look-up table. For example, in response to the sensor output and/or user input, the electronic processor 1010 may transmit a signal to the electronic processor 302 of the gas engine replacement device 10 to control the motor 36, to transmit a signal to the user interface 1016 to indicate a condition or operation of the gas engine replacement device 10 or the power equipment attached to the gas engine replacement device 10, or to transmit a signal via the power equipment/accessory interface 1018 to control the power equipment.

In some embodiments, the external electronics module 344 includes a motor 1022. The motor 1022 may be controlled by the electronic processor 1010 via a power switching network (not shown) of the external electronics module 344. The motor 1022 may drive an accessory (e.g., a fan, a vacuum, a sprayer, etc.) of the external electronics module 344, the gas engine replacement device 10, or the power equipment attached to the gas engine replacement device 10. The electronic processor 1010 may drive the motor 1022 or actuate an accessory such as a light or speaker, based on input received from the electronic processor 302 of the gas engine replacement device 10, from the power equipment via the power equipment/accessory 1018, from the sensor 1020, or user input received via the user interface 1016.

In some embodiments, the user interface 1016 includes digital controls on a customizable user interface, such as a touch display or a combination of knobs and buttons. In some embodiments, the user interface 1016 can be modular, wired, or wireless and can be attachable to the gas engine replacement device 10 or be handheld. In some embodiments, the external electronics module 344 can be controlled with a remote control that includes status indicators for certain characteristics of the gas engine replacement device 10, such as charge of the battery pack 50 and the temperature. In some embodiments, the external electronics module 344 can provide status indications with a remote programmable device.

Figure 11:
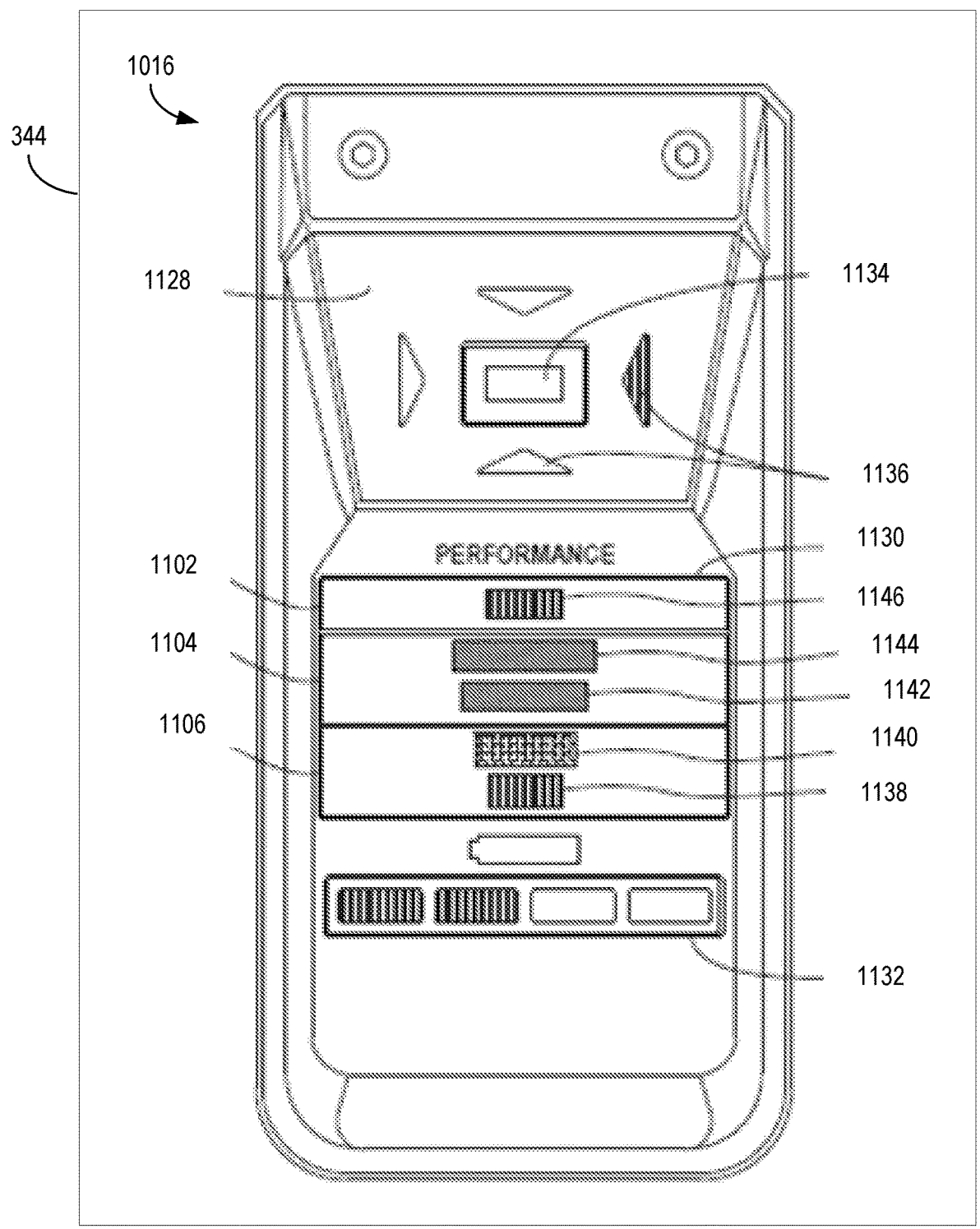
FIG. 11 is a diagram illustrating an external electronics module for attaching electronics to the gas engine replacement device of FIG. 1, which includes a user interface for providing feedback for power equipment that is attached to the gas engine replacement device, according to some embodiments.

FIG. 11 is a diagram illustrating an external electronics module 344 for attaching electronics to the gas engine replacement device of FIG. 1. The external electronics module 344 of FIG. 11 includes a user interface 1016 for providing feedback for power equipment that is attached to the gas engine replacement device 10. The power equipment is driven by the motor 36 of the gas engine replacement device 10. As illustrated, the user interface 1016 of FIG. 11 includes three components, including a level indicator 1128, an eco-indicator 1130, and a battery meter 1132. However, in some embodiments, the user interface 1016 may include only two of the three components and, in other embodiments, the user interface 1016 may include only one of the three components or further components in addition to the three components. User perception of the operation of high-voltage battery-powered power equipment is different compared to typical gas engine device. The operator may not realize the amount of current being drawn from the battery pack 50 of the gas engine replacement device 10 to run the power equipment. This lack of recognition may result in inefficient operation of the power tool, leading to faster than normal discharge of the battery pack or slower completion of a workpiece operation. The user interface 1016 may provide useful feedback to the operator to allow improved efficiency and control of the power equipment.

The level indicator 1128 includes a center indicator 1134 and direction indicators 1136. In the example illustrated, the center indicator 1134 is bar shaped and indicates whether the equipment driven by the gas engine replacement engine is level. For example, the center indicator 1134 indicates whether a rotational axis of the output shaft 140 is either parallel with the ground (i.e., horizontal, when the shaft is used in a sideways orientation) or perpendicular to the ground (i.e., vertical, when the shaft is used in an upright orientation). The center indicator 1134 may be illuminated to indicate to a user that the rotational axis is horizontal or vertical relative to the ground. The direction indicators 1136 include four indicators, one on each side of the center indicator 1134. The direction indicators 1136 are shaped like arrows that point towards the center indicator 1134. The direction indicators 1136 help the user in determining which direction to tilt or move the power equipment to align the rotational axis either parallel with or perpendicular to the ground. For example, the right direction indicator 1136 with the arrow pointing to the left may be illuminated when the power equipment is to be tilted or moved to the left. In one embodiment, the sensor 1020 (see FIG. 10) includes an accelerometer configured to indicate position relative to Earth's gravitational pull, which the electronic processor 1010 receives and on which the electronic processor 1010 bases control signals sent to the level indicator 1128 to indicate the level of the gas engine replacement device 10.

The eco-indicator 1130 is provided on the user interface 1016 to indicate an amount of power being used by the motor 36 of the gas engine replacement device 10 when the gas engine replacement device 10 is driving the power equipment (i.e., an amount of current being drawn from the battery pack 50 of the gas engine replacement device 10 to drive the motor 36). In the example illustrated, the eco-indicator 1130 includes five LED bars 1138, 1140, 1142, 1144, 1146. The LED bars 1138, 1140, 1142, 1144, 1146 are distributed in a performance map that is segmented into a plurality of performance regions 1102, 1104, 1106 for operating the motor 36 of the gas engine replacement device 10 to drive the coupled power equipment. Illumination of the LED bars 1138, 1140, 1142, 1144, 1146 is based on control signals transmitted by the electronic processor 302 to the external electronics module 344. For example, while the motor 36 is activated to drive the power equipment (e.g., based on user input to an input user interface 1016 on the an external electronics module 344, or a trigger input on the power equipment), the electronic processor 302 receives output from the current sensor 318 and determines the current flowing to the motor 36. The electronic processor 302 compares the detected motor current to a range of current thresholds to determine the current level. In one example, the current thresholds are 20%, 40%, 60%, 80%, and 100% of allowable current (e.g., a maximum current level) for driving the motor 36. The thresholds may be mapped to the LED bars 1138, 1140, 1142, 1144, 1146 respectively. The allowable current may be a specified current level that the battery pack 50 can discharge without damaging the battery pack 50 or the power equipment. This specified or maximum battery current may be chosen as a maximum allowable motor current. The electronic processor 302 then generates signals to the external electronics module 344 to illuminate the appropriate LED bar 1138, 1140, 1142, 1144, 1146 according to the determined current level.

The battery meter 1132 of the user interface 1016 includes LED bars (for example, four LED bars) that are illuminated to indicate a state of charge of the battery pack 50 of the gas engine replacement device 10. The LED bars of the battery meter 1132 are illuminated based on signals received by the external electronics module 344 from the electronic processor 302 of the gas engine replacement device 10 that indicate remaining charge level of the battery pack 50. The LED bars of the battery meter 1132 may be illuminated according to corresponding charge level thresholds to indicate the level of charge remaining in the battery pack 50.

Figure 12:
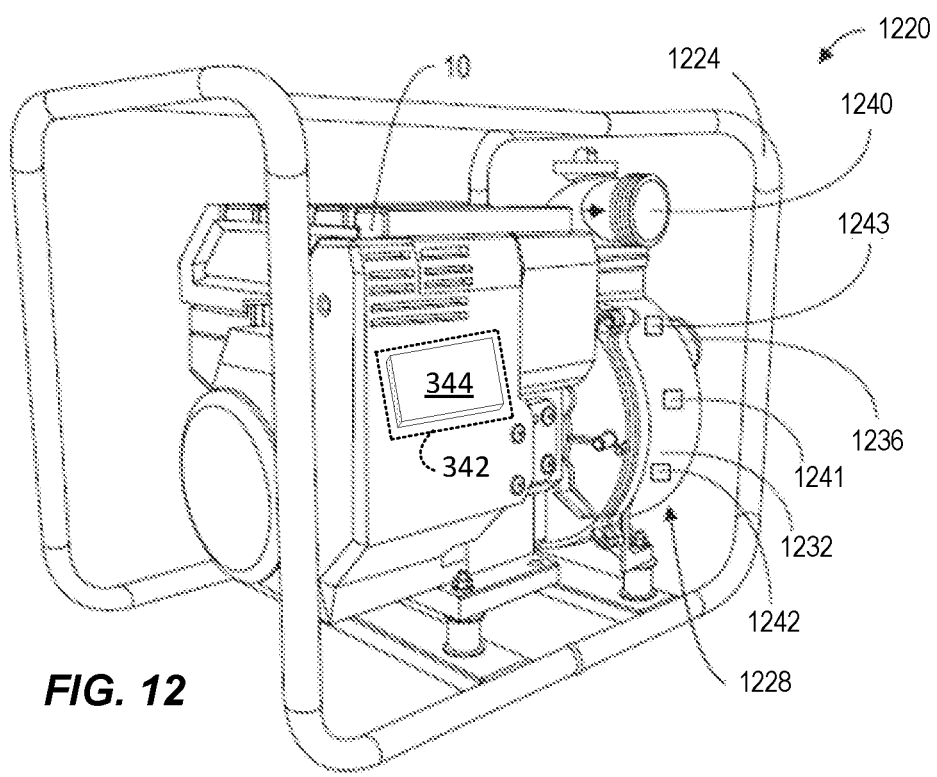
FIG. 12 is a perspective view of a pump system attached to a gas engine replacement device with an external electronics module received by the gas engine replacement device, according to some embodiments

FIG. 12 is a perspective view of a pump system 1220 attached to a gas engine replacement device 10 with an external electronics module 344 received by the gas engine replacement device 10. The pump system 1220 includes a frame 1224 supporting the gas engine replacement device 10 and a pump 1228 with the gas engine replacement device 10 operable to drive the pump 1228. A GER device interface 1114 (shown in FIG. 10) of the external electronics module 344 is received by a module interface 342342342 of the gas engine replacement device 10 to connect the external electronics module 344 to the gas engine replacement device 10. The illustrated pump 1228 (i.e., power equipment) is a centrifugal pump having an impeller positioned within a housing 1232 of the pump 1228 that is rotatable about an axis to move material from an inlet 1236 of the pump 1228 to an outlet 1240 of the pump 1228. Specifically, the pump 1228 is a "trash pump" that includes enough clearance between the impeller of the pump 1228 and the housing 1232 (e.g., 8 millimeters) to provide a mixture of a liquid (e.g., water) and debris (e.g., solid material like mud, small rocks, leases, sand, sludge, etc.) to pass through the pump 1228 from the inlet 1236 to the outlet 1240 without the debris getting trapped within the pump 1228 and decreasing the performance of the pump system 1220.

Typically, gas engine pumps include only one mode of operation. Particularly, the gas engine may rotate the motor only in one direction, which limits the functionality of the pump. In contrast, the pump system 1220 includes the gas engine replacement device 10 including a motor 36 that can be rotated in both the forward and reverse directions. Accordingly, the pump system 1220 is adapted to perform different functions based on the rotation direction of the motor. When the electronic processor 302 rotates the motor 36 in a first direction, the pump 1228 may drive the impeller in a forward direction to move material from an inlet 1236 of the pump 1228 to an outlet 1240 of the pump 1228. When the electronic processor 302 rotates the motor 36 in a second direction, the pump 1228 may drive the impeller to clear jams or clear the pump 1228 if debris is stuck within the pump 1228 (without utilizing a transmission including a forward gear and a rearward gear). In some embodiments, the motor 36 may controlled by the electronic processor 302 to rotate at slower speed in the second direction than in the first direction to clear jams in the pump 1228. For example, the electronic processor 302 may provide PWM signals to the FETs of the power switching network 310 with a higher duty ratio when driving in the first direction than the duty ratio when driving in the second direction, to rotate the motor 36 at a higher speed in the first direction compared to the second direction.

Pump sensors 1241, 1242 of the pump 1228 are in communication with the electronic processor 1010 of the external electronics module via the power equipment/accessory interface 1018. The sensor 1241 detects an amount of liquid being moved through the pump 1228. Based on output from the sensor 1241, the electronic processor 1010 of the external electronics module 344 transmits a signal to the electronic processor 302 of the gas engine replacement device 10 to enable operation of the pump 1228 (e.g., drive the motor 36) if the amount of liquid is at or above a threshold level and automatically stop operation of the pump 1228 if the amount of liquid is below the threshold level. However, in other embodiments, the electronic processor 302 can simply monitor the current drawn by the motor 36 to determine whether to slow down or stop the motor 36.

The sensor 1242 on the pump 1228 is connected to the electronic processor 1010 via the power equipment/accessory interface 1018 of the external electronics module 344 and is arranged in an impeller reservoir of the pump 1228. The sensor 1242 monitors suction or fluid level in the impeller reservoir. The electronic processor 1010 receives output from the sensor 1242 and may output a signal to an indicator (e.g., an LED or display device) of the user interface 1016 when output of the sensor 1242 indicates that the pump 1228 is not adequately primed. In some embodiments, the electronic processor 1010 may transmit a signal to the electronic processor 302 of the gas engine replacement device 10 to automatically shut off the pump 1228 to protect the pump system 1220 based on the output of the sensor 1242. Alternatively, or in addition, based on output from the sensor 1242, the electronic processor 1010 may transmit a signal to the electronic processor 302 or directly to an electronically controlled valve 1243 on the pump 1228 to adjust an exhaust opening to support an auto-priming capability to protect the pump system 1220.

Figure 13:
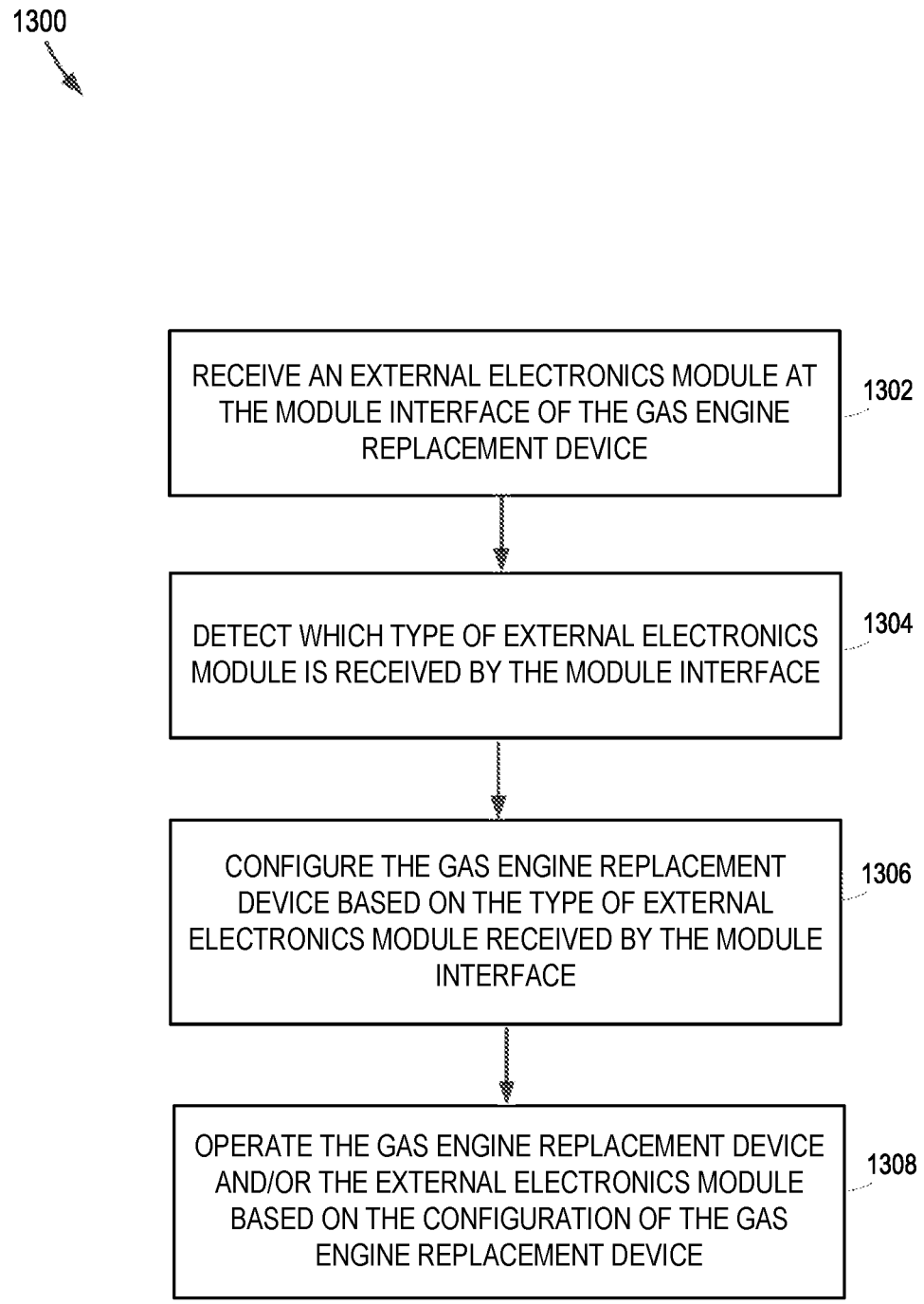
FIG. 13 is a flowchart of a method for interfacing one or more external electronics modules to the gas engine replacement device of FIG. 1, according to some embodiments.

FIG. 13 is a flowchart of a method 1300 for interfacing one or more external electronics modules 344 to the gas engine replacement device 10 of FIG. 1. The following method outlines a process for interfacing one external electronics module 344, but may also be applied to interfacing additional external electronics module(s) 344 to the gas engine replacement device 10.

In step 1302, the gas engine replacement device 10 receives an external electronics module 344 at a module interface 342*a*, 342*b*, 342*c*. The external electronics module 344 includes electronics for feature expansion of the gas engine replacement device 10 and/or the power equipment driven by the gas engine replacement device 10. A GER device interface 1114 of the external electronics module 344 (shown in FIG. 10) is received by a module interface 342*a*, 342*b*, 342*c* of the gas engine replacement device 10 (shown in FIG. 9) to connect the external electronics module 344 to the gas engine replacement device 10. For example, with reference to the pump system 1220 of FIG. 12, the gas engine replacement device 10 includes a module interface 342*a*, 342*b*, 342*c* that receives the external electronics module 344. In another example, the gas engine replacement device 10 is coupled to a different piece of power equipment, such as an agricultural sprayer, a concrete saw, a compactor, or the like.

In step 1304, the electronic processor 302 of the gas engine replacement device 10 detects which type of external electronics module 344 is received by the module interface 342*a*, 342*b*, 342*c* and may establish communication with the received external electronics module 344 based on the configured method of communication for the receiving module interface 342*a*, 342*b*, 342*c*. For example, the electronic processor 302 may determine the type of attached external electronics module 344 based on a signal(s) sent to and/or received from to the module interface 342*a*, 342*b*, 342*c*. In some embodiments, the electronic processor 302 receives a device identifier (ID) from external electronics module 344. Alternatively or in addition, the electronic processor 302 may determine the type of attached external electronics module 344 based on a voltage level or a resistance value detected using an ADC of the electronic processor 302 that is in communication with the GER device interface 1014, or based on a type of communication protocol used. In some embodiments, the electronic processor 302 may retrieve information about the attached external electronics module 344 from a look-up table stored in the memory 306 (e.g., using data received or deduced from the external electronics module 344 as an index into the look-up table) or may determine the type of received external electronics module 344 based on information in the signal received from the external electronics module 344.

For example, with reference to FIG. 12, the electronic processor 302 of the gas engine replacement device 10 in the pump system 1220 may determine that the external electronics module 344 attached to the module interface 342*a*, 342*b*, 342*c* is an external electronics module 344 for a pump system, which includes a power equipment/accessory interface 1018 (see FIG. 10) that is configured to communicate with one or more of the sensor 1241, the sensor 1242, and the electronically controlled valve 1243 (e.g., via a wired connection). In some embodiments, the electronic processor 302 determines that the external electronics module 344 is an second type of external electronics module 344 for a pump system, which further (or instead) includes the user interface 1016 to provide feedback on operation of the gas engine replacement device 10, and associated sensors 1020 used to generate the information displayed on the user interface 1016. For example, the user interface 1016 may include one or more of the level indicator 1128, eco-indicator 1130, and battery meter 1132, as illustrated in FIG. 11, and the sensors 1020 may include on or more of a current sensor, battery sensor, and accelerometer.

In another example, where the gas engine replacement device 10 is coupled to drive a pump motor of an agricultural sprayer, the electronic processor 302 may determine that the external electronics module 344 is an external electronics module 344 for a sprayer system, which includes a user interface 1016 with inputs including an activation switch and a pressure level control mechanism for user control of the sprayer (e.g., the user interface(s) 1016) and a supply level indicator to inform the user of the fluid level in a tank of the sprayer (e.g., indicating an amount of the fluid to be sprayed by the sprayer that is left in the tank). In another example, the gas engine replacement device 10 drives a propulsion motor of the sprayer (i.e., providing motive force to propel drive wheels of the sprayer), and the external electronics module 344 is determined to be a second type of external electronics module 344 for a sprayer that includes an output to a motor (e.g., motor 1022) that serves as a pump motor to pressurize and spray the fluid, as well as the other inputs and outputs as described with the first external electronics module 344 for a sprayer.

In another example, the gas engine replacement device 10 is coupled to power equipment and the electronic processor 302 determines that the external electronics module 344 is of the type shown in FIG. 11, or a generic external electronics module 344 configured to sense vibration (e.g., the sensor 1020 includes a vibration sensor), configured to receive a mode select input from a user via the user interface 1016, configured to receive a control signal from the electronic processor 302 and provide an output to a solenoid actuator that is part of the external electronics module 344 or via the power equipment/accessory interface 1018, or a combination thereof.

In step 1306, the electronic processor 302 configures the gas engine replacement device 10 for interaction with the received external electronics module 344. For example, the electronic processor 302 can determine a definition (e.g., defining a communication protocol, available features, operational ranges, and the like) for the external electronics module 344 and unlock appropriate features to be accessed by or for the external electronics module 344. In some embodiments, a device ID is received from the received external electronics module 344 and is used as an index into a look-up table in the memory 306 to retrieve configuration data for the particular type of external electronics module 344, and the electronic processor 302 then configures the definition for the specific external electronics module 344 based on the configuration data. Then, in subsequent communications with the same external electronics module 344, the same device ID may be used as packet identification such that the communications manager 340 can direct data received from the received external electronics module 344 into an appropriate section of firmware.

For example, whereas in step 1304 the electronic processor 302 may determine that the external electronics module 344 coupled to the gas engine replacement device 10 is of a first or second type of external electronics module for a pump system, in step 1306, the electronic processor 302 may access the memory 306 using a device ID to determine the various inputs, outputs, and/or other features of the external electronics module 344 and how to communicate and use these aspects. For example, certain firmware routines associated with the device ID may be enabled or retrieved to allow the electronic processor 302 to interact with the external electronics module 344.

In step 1308, the gas engine replacement device 10 and the received external electronics module 344 are operated based on the configuration from step 1306. The electronic processor 302 may determine that the received external electronics module 344 is a type of module that receives input, provides output, or does both and operate accordingly. For example, the received external electronics module 344 may be an input module and may include a sensor 1020, a user interface 1016, or a power equipment/accessory interface 1018 to receive input. The electronic processor 1010 of the received external electronics module 344 may receive sensor input, user input, or input from power equipment attached to the gas engine replacement device 10 and communicate the input to the electronic processor 302 of the gas engine replacement device 10. The electronic processor 302 may take an action based on the received input, such as, drive or control speed of the motor 36 or transmit a signal to activate the load 1022 or to control the user interface 1016 on a different external electronics module 344.

In one example of the external electronics module 344 configured as an input module, the gas engine replacement device 10 having received the external electronics module 344 is attached to an agricultural sprayer (e.g., disposed on a vehicle or a walk-behind). The user interface 1016 of the received external electronics module 344 may have inputs including an activation switch and a pressure level control mechanism for a user to activate and control the intensity of the sprayer, respectively. In an example of step 1308, the external electronics module 344 receives a pressure level (e.g., via a dial or selector of the user interface 1016) and actuation of the activation switch (e.g., via a push button or toggle of the user interface 1016). In response, the external electronics module 344 transmits a signal to the electronic processor 302 of the gas engine replacement device 10. The electronic processor 302 then transmits a signal to the power switching network 310 to drive the motor 36 with power from the battery pack 50 based on actuation of the activation switch, and sets the PWM duty ratio for controlling the power switching network 310 based on the pressure level (e.g., the higher the pressure level, the higher the duty ratio). Alternatively, or in addition, the external electronics module 344 may include the sensor 1020 and the signal sent to the electronic processor 302 to indicate to activate the motor 36 may be based on output from the sensor 1020. For example, the sensor 1020 may be an accelerometer or a tachometer that detects the speed of the gas engine replacement device 10 and sprayer (or the vehicle transporting them). A signal based on output from the sensor 1020 is transmitted to the electronic processor 302 from the external electronics module 344, and the electronic processor 302 control the activation and/or the pressure level of the sprayer based on the speed or movement of the sprayer system. For example, the sprayer may be activated by the electronic processor 302 when the speed exceeds a first lower threshold (i.e., the motor 36 is controlled at a first lower duty ratio), and then the duty ratio increases as the speed increases (e.g., in 2, 5, or 10% increments mapped to corresponding incrementing speed thresholds).

In another example, the received external electronics module 344 is configured as an output module and the gas engine replacement device 10 having received the external electronics module 344 is again attached to an agricultural sprayer (e.g., disposed on a vehicle or a walk-behind). The external electronics module 344 includes a user interface 1016 that has audio and/or visual indicators that communicate performance or status of the gas engine replacement device 10 and/or power equipment attached to the gas engine replacement device 10. An example of an external electronics module 344 that includes the user interface 1016 as an output device is described with respect to FIG. 11. As illustrated and described with respect to FIG. 11, the user interface 1016 includes one or more of the level indicator 1128, the eco-indicator 1130, and the battery meter 1132. The electronic processor 302 may control the sprayer by driving the motor 36 and provide performance feedback to the user via the user interface 1016 of the external electronics module 344.

Moreover, an external electronics module 344 may include both input and output components such that the electronic processor 302 controls the motor 36 based on input received by the external electronics module 344 and such that the electronic processor 302 controls the external electronics module 344 to provide user feedback. For example, with respect to the sprayer examples above, the external electronics module 344 may provide input signals to the electronic processor 302 (e.g., via the activation switch and pressure level) used to control the motor 36, and may be controlled by the electronic processor 302 to provide output via the user interface 1016 (e.g., via indicators of the user interface 1016 illustrated in FIG. 11). The input may be received by the electronic processor 302 of the gas engine replacement device 10 and the electronic processor 302 may provide feedback to the external electronics module 344 for display on the user interface 1016. In some embodiments, the electronic processor 302 or the electronic processor 1010 may process input from the sensor 1020, the user interface 1016, or the power equipment/accessory interface 1018 and provide feedback to the user based via the user interface 1016 based on the input.

In some embodiments, the method 1300 is executed multiple times, once for each external electronics module 344 attached to the gas engine replacement device 10 (via respective module interfaces 342a, 342b, 342c). For example, with respect to the sprayer examples above, a first external electronics module 344 configured as an input module to provide input signals to the electronic processor 302 (e.g., via the activation switch and pressure level) used to control the motor 36 may be attached to a first module interface 342a, 342b, 342c, and then a second external electronics module 344 configured as an output module to be controlled by the electronic processor 302 to provide output via the user interface 1016 (e.g., via indicators of the user interface 1016 illustrated in FIG. 11) is attached to a second module interface 342a, 342b, 342c. The method 1300 may be executed upon receipt of each external electronics module 344.

The gas engine replacement device 10 may be coupled to and drive other power equipment such as a compactor, a rammer, a jetter, and a pump system, etc.

In some embodiments, the gas engine replacement device 10 is configured for utilizing a specified communication protocol to communicate with an external electronics module 344 via a module interface 342a, 342b, 342c (e.g., RS485, UART, SPI, CAN bus, USB, voltage or resistance levels, etc.). The configured communication protocol may be fixed for the life of the gas engine replacement device 10, or may be configurable or reconfigurable. For example, the communication protocol may be pre-configured in the gas engine replacement by an OEM of the gas engine replacement device 10. Alternatively or in addition, an OEM user or an end user may configure or reconfigure the communication protocol via a module interface 342a, 342b, 342c. Different module interfaces 342a, 342b, 342c may be configured for the same or different methods of communication.

In some embodiments, the external device 338 is used to configure or reconfigure the gas engine replacement device 10. The external device 338 may be programmed with an application that generates a graphical user interface. The graphical user interface enables the user to select or define a communication protocol by the electronic processor 302 via one or more module interfaces 342a, 342b, 342c. The external device 338 then transmits information or communication parameters that are based on the user's selection to the electronic processor 302 via the transceiver 326, and the electronic processor 302 configures the gas engine replacement device 10 accordingly. In some embodiments, a lookup table in the memory 306 may include communication parameters for configuring the communication protocol via the module interface(s) 342.

We claim:

1. A method for expanding features of a gas engine replacement device that drives power equipment, the method comprising:
controlling, by an electronic processor of the gas engine replacement device, a power switching network to selectively provide power from a battery pack to rotate a motor of the gas engine replacement device;
receiving, by a module interface of the gas engine replacement device, an external electronics module;
detecting, by the electronic processor of the gas engine replacement device, a type of the external electronics module from a plurality of types of the external electronics module;
configuring, by the electronic processor, the gas engine replacement device based on the type of the external electronics module,
communicating, by the electronic processor, with the external electronics module via the module interface, and
configuring, by the electronic processor, the gas engine replacement device for a specified method of communication via the module interface of the gas engine replacement device, wherein the specific method of communication is selected based on the type of the external electronic module.

2. The method of claim 1, further comprising:
operating, by the electronic processor, the gas engine replacement device to control the power equipment based on an input received from the external electronics module,
wherein the external electronics module incudes at least one of a sensor, a user interface, or a power equipment interface.

3. The method of claim 1, further comprising:
transmitting, by the electronic processor, performance information of the power equipment to the external electronics module for indication of the performance information by a user interface of the external electronics module.

4. The method of claim 1, further comprising:
receiving, using the electronic processor, a device identifier from the external electronics module, wherein the type of the external electronics module is detected based on the device identifier; and
retrieving, using the electronic processor, configuration data for the type of external electronics module based on the device identifier, wherein the gas engine replacement device is configured for interaction with the external electronics module based on the configuration data.

5. The method of claim 1, wherein configuring the gas engine replacement device includes configuring an operational range of the gas engine replacement device.

6. The method of claim 1, wherein configuring the gas engine replacement device includes configuring the gas engine replacement device to operate the motor based on an activation input received from the external electronics module and a sensor input received from the external electronics module.

7. A gas engine replacement device with feature expansion for driving power equipment, the gas engine replacement device comprising:
a housing;
a battery receptacle coupled to the housing, the battery receptacle configured to removably receive a battery pack;
a motor located within the housing;
a power take-off shaft receiving torque from the motor and protruding from a side of the housing;
a power switching network configured to selectively provide power from the battery pack to the motor;
a module interface configured to receive an external electronics module; and
an electronic processor connected to the power switching network, the module interface, and a memory, the memory storing instructions that when executed by the electronic processor configure the electronic processor to:
selectively provide power from the battery pack to rotate the motor,
detect a type of the external electronics module from a plurality of types of external electronics modules, configure the gas engine replacement device based on the type of the external electronics module, communicate with the external electronics module via the module interface, and configure the gas engine replacement device for a specified method of communication via the module interface based on the type of external electronics module.

8. The gas engine replacement device of claim 7, wherein the electronic processor is further configured to:

operate the gas engine replacement device to control the power equipment based on an input received from the external electronics module, wherein the external electronics module incudes at least one of a sensor, a user interface, or a power equipment interface.

9. The gas engine replacement device of claim 7, wherein the electronic processor is further configured to:

transmit performance information of the power equipment to the external electronics module for indication of the performance information by a user interface of the external electronics module.

10. The gas engine replacement device of claim 7, wherein the electronic processor is further configured to:

receive a device identifier from the external electronics module, wherein the type of the external electronics module is detected based on the device identifier; and retrieve configuration data for the type of external electronics module based on the device identifier, wherein the gas engine replacement device is configured for interaction with the external electronics module based on the configuration data.

11. The gas engine replacement device of claim 7, wherein configuring the gas engine replacement device includes configuring the gas engine replacement device to operate the motor based on an activation input received from the external electronics module and a sensor input received from the external electronics module.

* * * * *